United States Patent
Yamagishi et al.

(10) Patent No.: US 11,425,433 B2
(45) Date of Patent: Aug. 23, 2022

(54) CONTENT DELIVERY CONTROL APPARATUS, CONTENT DELIVERY CONTROL METHOD, PROGRAM, AND CONTENT DELIVERY CONTROL SYSTEM

(71) Applicant: Sony Corporation, Tokyo (JP)

(72) Inventors: Yasuaki Yamagishi, Kanagawa (JP); Kazuhiko Takabayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/971,317

(22) PCT Filed: Feb. 14, 2019

(86) PCT No.: PCT/JP2019/005189
§ 371 (c)(1),
(2) Date: Aug. 20, 2020

(87) PCT Pub. No.: WO2019/167634
PCT Pub. Date: Sep. 6, 2019

(65) Prior Publication Data
US 2020/0396491 A1 Dec. 17, 2020

(30) Foreign Application Priority Data
Feb. 28, 2018 (JP) .............................. JP2018-035082

(51) Int. Cl.
*H04N 21/235* (2011.01)
*H04N 21/231* (2011.01)
(Continued)

(52) U.S. Cl.
CPC ......... *H04N 21/235* (2013.01); *H04N 21/231* (2013.01); *H04N 21/234309* (2013.01);
(Continued)

(58) Field of Classification Search
CPC .............. H04N 21/235; H04N 21/231; H04N 21/234309; H04N 21/433; H04N 21/435;
(Continued)

(56) References Cited

U.S. PATENT DOCUMENTS

2014/0040959 A1 2/2014 Oyman
2015/0281299 A1 10/2015 Moustafa et al.
(Continued)

FOREIGN PATENT DOCUMENTS

| JP | 2017-143528 A | 8/2017 |
|---|---|---|
| JP | 2018-014746 A | 1/2018 |
| JP | 2018-023169 A | 2/2018 |

OTHER PUBLICATIONS

Extended European search report dated Jan. 14, 2021, in corresponding European patent Application No. 19761032.2, 9 pages.
(Continued)

*Primary Examiner* — Anthony Bantamoi
(74) *Attorney, Agent, or Firm* — Xsensus, LLP

(57) ABSTRACT

The present disclosure relates to a content delivery control apparatus, a content delivery control method, a program, and a content delivery system capable of achieving commonality of conditions associated with transcoding at the time of content delivery in different CDNs and supporting a standard upload interface.

In a case in which definition information is stored in a metadata file, an original data stream is controlled on the basis of the definition information. Meanwhile, in a case in which access information for accessing the definition information is stored in the metadata file, then the definition information is requested on the basis of the access information, and transcoding of an original stream is controlled on the basis of the definition information received in response (Continued)

to the request. The present disclosure is applicable to a content delivery system that delivers a content using SDP.

17 Claims, 46 Drawing Sheets

(51) Int. Cl.
    *H04N 21/2343*     (2011.01)
    *H04N 21/433*     (2011.01)
    *H04N 21/435*     (2011.01)
    *H04N 21/4402*     (2011.01)
    *H04N 21/643*     (2011.01)

(52) U.S. Cl.
    CPC ......... *H04N 21/433* (2013.01); *H04N 21/435* (2013.01); *H04N 21/440218* (2013.01); *H04N 21/643* (2013.01)

(58) Field of Classification Search
    CPC ......... H04N 21/440218; H04N 21/643; H04N 21/234363; H04N 21/25833; H04N 21/25825; H04N 21/26258; H04N 21/23439; H04N 21/2187; H04N 21/2225; H04N 21/8456; H04N 21/2662; H04N 21/222; H04L 67/141; H04L 67/142; H04L 67/02; H04L 67/10; H04L 67/146; H04L 67/1097; G06F 13/00
    See application file for complete search history.

(56) References Cited

U.S. PATENT DOCUMENTS

| | | |
|---|---|---|
| 2015/0382034 A1 | 12/2015 | Thangaraj et al. |
| 2016/0163023 A1 | 6/2016 | Wey et al. |
| 2016/0352799 A1* | 12/2016 | Oyman ................ H04L 65/608 |

OTHER PUBLICATIONS

Editor (Ericsson LM), "Framework for Live Uplink Streaming Permanent Document", 3GPP TSG SA4#96, Tdoc S4-171130, Nov. 13-17, 2017, total 48 pages, Albuquerque, New Mexico, USA.
ISO/IEC 23009-1 Third edition, "Information technology—Dynamic adaptive streaming over HTTP (DASH)—Part 1: Media presentation description and , segment formats", International Standard, Jan. 9, 2017, total 218 pages, ISO/IEC 23009-1:2014(E).
ISO/IEC JTC 1/SC 29, "Information technology—Dynamic adaptive streaming over HTTP {DASH)—Part i: Media presentation description and segment formats", ISO/IEC JTC 1/SC 29/WG 11, Jan. 5, 2012, total 133 pages, ISO/IEC 23009-1:2012(E).
3GPP, TS 26.238 V15.0.0, "3rd Generation Partnership Project; Technical Specification Group Services and System Aspects; Uplink Streaming (Release 15)", Dec. 2017, total 33 pages.
3GPP, "3rd Generation Partnership Project; Technical Specification Group Services and System Aspects; IP Multimedia Subsystem (IMS); Multimedia Telephony; Media handling and interaction (Release 15)", TS 26.114 V15.1.0, Dec. 2017, total 406 pages.
International Search Report and Written Opinion dated Apr. 2, 2019 for PCT/JP2019/005189 filed on Feb. 14, 2019, 9 pages including English Translation of the International Search Report.

* cited by examiner

FIG.5

(a) Service ESTABLISHMENT REQUEST/RESPONSE
　・FLUS SOURCE -> FLUS SINK
　　HTTP METHOD: HTTP POST(BODY PART: ServiceResource)
　・FLUS SOURCE <- FLUS SINK
　　HTTP STATUS CODE: HTTP 201 CREATED
　　(location HEADER: url of ServiceResource UPDATED BY FLUS SINK)
　　　-IN CASE OF SUCCESS IN Service ESTABLISHMENT, VALUE (ServiceID)
　　　ALLOCATED TO service-id OF ServiceResource GENERATED BY FLUS SINK
　　　IS STORED (b) ServiceResource REQUEST/RESPONSE
　・FLUS SOURCE -> FLUS SINK
　　HTTP METHOD: HTTP GET
　　(url OF ServiceResource RETURNED BY Service
　　ESTABLISHMENT RESPONSE AND UPDATED BY FLUS SINK)
　・FLUS SOURCE <- FLUS SINK
　　HTTP STATUS CODE: HTTP 200 OK (BODY PART: ServiceResource CONCERNED)

(c) ServiceResource UPDATE/RESPONSE
　・FLUS SOURCE -> FLUS SINK
　　HTTP METHOD: HTTP PUT
　　(BODY PART: ServiceResource UPDATED BY FLUS SOURCE)
　・FLUS SOURCE <- FLUS SINK
　　HTTP STATUS CODE: HTTP 200 OK
　　　-IN CASE OF SUCCESS IN Service UPDATE
　　　　(location HEADER: url of ServiceResource UPDATED BY FLUS SINK)

(d) Session ESTABLISHMENT REQUEST/RESPONSE
　・FLUS SOURCE -> FLUS SINK
　　HTTP METHOD: HTTP POST(BODY PART: ServiceResource)
　・FLUS SOURCE <- FLUS SINK
　　HTTP STATUS CODE: HTTP 201 CREATED
　　(location HEADER: url of ServiceResource UPDATED BY FLUS SINK)
　　　-IN CASE OF SUCCESS IN Session ESTABLISHMENT, VALUE (SessionID)
　　　ALLOCATED TO session-id OF SessionResource GENERATED BY FLUS SINK IS
　　　STORED

FIG.6

```
{
  "service": {
    "service-id" : "SERVICE IDENTIFIER,"
    ...
  }
}
```

FIG. 7

```
"session": [
    "session-id": "SESSION IDENTIFIER,"
    "session-start": "SESSION START CLOCK TIME,"
    "session-end": "SESSION END CLOCK TIME,"
    "session-description": ("INFORMATION FOR FLUS SINK TO ACQUIRE STREAM (BY Push/Pull) FROM FLUS SOURCE"),
    ...
]
```

FIG. 8

```
・FOR Pull ACQUISITION
{
  "session-description": "URL OF MPD OF SESSION STREAM CONCERNED"
  // IN CASE OF SESSION DESCRIPTION PERFORMED IN DASH-MPD (STREAM IS TRANSFERRED IN HTTP(S)/TCP/IP OR HTTP2/QUIC/IP)
}

・FOR Push ACQUISITION
{
  "session-description": "URL OF SDP (Session Description Protocol) OF SESSION STREAM CONCERNED"
  // IN CASE OF SESSION DESCRIPTION PERFORMED IN SDP (STREAM IS TRANSFERRED IN ROUTE(FLUTE)/UDP/IP, /RTP/UDP/IP, OR THE LIKE)
}
```

FIG. 9

```
...
t=3034423619 3042462419 // START/END CLOCK TIME
...
c=IN IP6 FF1E:03AD::7F2E:172A:1E24 // IP ADDRESS
...
m=video 8000 RTP/AVP 96 // VIDEO ASSOCIATED ATTRIBUTE
a=rtpmap:96 H264/90000
a=fmtp:96 packetization-mode=0; profile-level-id=4D4033; ...
a=transcodeDirective:"CONTENTS OF TranscodeDirective (base64-ENCODED CHARACTER STRING OF TranscodeDirective DESCRIBED IN XML)"
```

FIG. 10

```
{
  "session": {
    "session-id": "SESSION IDENTIFIER,"
    "session-start": "SESSION START CLOCK TIME,"
    "session-end": "SESSION END CLOCK TIME,"
    "session-description": ("INFORMATION FOR FLUS SINK TO ACQUIRE STREAM (BY Push/Pull) FROM FLUS SOURCE"),
    "transcode-directive": "CONTENTS OF TranscodeDirective (base64-ENCODED CHARACTER STRING OF TranscodeDirective DESCRIBED IN XML)"
    ...
  }
}
```

FIG.11

(a) SessionResource REQUEST/RESPONSE
    ·FLUS SOURCE -> FLUS SINK
        HTTP METHOD: HTTP GET
        (url OF SessionResource RETURNED BY Session ESTABLISHMENT RESPONSE AND UPDATED BY FLUS SINK)
    ·FLUS SOURCE <- FLUS SINK
        HTTP STATUS CODE: HTTP 200 OK (BODY PART: SessionResource CONCERNED)

(b) SessionResource UPDATE
    ·FLUS SOURCE -> FLUS SINK
        HTTP METHOD: HTTP PUT (BODY PART: SessionResource UPDATED BY FLUS SOURCE)
    ·FLUS SOURCE <- FLUS SINK
        HTTP STATUS CODE: HTTP 200 OK
           -IN CASE OF SUCCESS IN Session UPDATE
           (location HEADER: url OF SessionResource UPDATED BY FLUS SINK)

(c) Session RELEASE
    ·FLUS SOURCE -> FLUS SINK
        HTTP METHOD: HTTP DELETE (url OF SessionResource)
    ·FLUS SOURCE <- FLUS SINK
        HTTP STATUS CODE: HTTP 200 OK
           -IN CASE OF SUCCESS IN Session RELEASE
           (location HEADER: url OF RELEASED SessionResource)

(d) Service RELEASE
    ·FLUS SOURCE -> FLUS SINK
        HTTP METHOD: HTTP DELETE (url OF SessionResource)
    ·FLUS SOURCE <- FLUS SINK
        HTTP STATUS CODE: HTTP 200 OK
           -IN CASE OF SUCCESS IN Service RELEASE
           (location HEADER: url OF RELEASED ServiceResource)

FIG.24

```
<MPD ...>
 <Period ...>
  <AdaptationSet ...>
   <TranscodeDirective ...>
    ...
   </TransocdeDirective>
  </AdaptationSet>
 </Period>
</MPD>
```

FIG. 25

```
<MPD...>
<Period...>
<AdaptationSet...>
<TranscodeDirective url='( URL OF TranscodeDirective FILE )'/>
</AdaptationSet>
</Period>
</MPD>
```

FIG.26

(a) transcodable ATTRIBUTE
    TranscodeDirective@transcodable (true OR false)
        true: TRANSCODABLE
        false: NON-TRANSCODABLE (b) upScalable ATTRIBUTE
    TranscodeDirective@upScalable (true OR false)
        true: UPSCALABLE
        false: NON-UPSCALABLE (c) processingLimit ATTRIBUTE
    TranscodeDirective@processingLimit (MAXIMUM DELAY TIME)

(d) Allowed ELEMENT
    TranscodeDirective/Allowed
    (/Parameters/Video*, OR, /Parameters/Audio*)

(e) Prohibited ELEMENT
    TranscodeDirective/Prohibited
    (/Parameters/Video*, OR, /Parameters/Audio*)

(f) Condition ELEMENT
    TranscodeDirective/Condition
    (CONDITION TO WHICH VARIOUS CONSTRAINTS/POLICIES, etc.
    DESCRIBED IN TranscodeDirective CONCERNED CAN BE APPLIED)

FIG. 27

```
<Condition schemeIdUri='urn:ODRL'><![CDATA[CHARACTER STRING OF ODRL DESCRIPTION]]></Condition>
```

FIG.28

```
{
  "@context":"http://www.w3.org/ns/odrl.jsonld",
  "@type":"Agreement",
  "uid":"http://example.com/policy:9090",
  "profile":"http://example.com/odrl:profile:07",
  "permission":[{
    "target":"http://a.com/aProgramStream",
    "assigner":"http://a.com",
    "assignee":"http://cdn.com"
    "action":"transform",
    "constraint":[{
      "leftOperand":"dateTime",
      "operator":"lteq",
      "rightOperand":"2017-12-31"
    }]
  }]
}
```

FIG.29

(a) TranscodeEventNotification ELEMENT
TranscodeDirective/TranscodeEventNotification
(EVENT NOTIFICATION TO WHICH VARIOUS CONSTRAINTS/ POLICIES, etc.
DESCRIBED IN TranscodeDirective CONCERNED ARE APPLIED)

(b) dateTime ATTRIBUTE
TranscodeDirective/TranscodeEventNotification@dateTime
(CLOCK TIME OF OCCURRENCE OF EVENT)

(c) MPDUrl ATTRIBUTE
TranscodeDirective/TranscodeEventNotification@MPDUrl
(URL OF MPD CONCERNED)

(d) AdaptationSetId ATTRIBUTE
TranscodeDirective/TranscodeEventNotification@AdaptationSetId
(Id OF AdaptationSet TO BE TRANSCODED)

(e) notificationUrl ATTRIBUTE
TranscodeDirective/TranscodeEventNotification@notificationUrl
(DESTINATION URL OF notification)

FIG. 30

```
<TranscodeDirective transcodable='true' upScalable='true'>
<Allowed>
<Parameters>
<Video resolution='3840x2160' framerate='120'/>
</Parameters>
</Allowed>
<TranscodeEventNotification dateTime='2002-05-30T09:30:10.5' MPDUri='https://a.com/a.mpd' AdaptationSetId='2'/>
</TranscodeDirective>
```

FIG.31

(a) Parameters/Video ELEMENT
    TranscodeDirective/.../Parameters/Video (@VARIOUS Video ATTRIBUTES)

(b) profile ATTRIBUTES
    TranscodeDirective/.../Parameters/Video@profile
    (profile NAME, profile NAME, ...)

(c) resolution ATTRIBUTE
    TranscodeDirective/.../Parameters/Video@resolution
    ("1024×768", "1920x1080"...)

(d) frameRate ATTRIBUTE
    TranscodeDirective/.../Parameters/Video@frameRate
    ("60", "120"...)

(e) bitDepth ATTRIBUTE
    TranscodeDirective/.../Parameters/Video@bitDepth
    ("8", "10"...)

(f) colorSpace ATTRIBUTE
    TranscodeDirective/.../Parameters/Video@colorSpace
    ("RGB", "YCbCr"...)

(g) gamma ATTRIBUTE
    TranscodeDirective/.../Parameters/Video@gamma
    ("1.8", "2.2"...)

(h) upScalingPatternList ATTRIBUTE
    TranscodeDirective/.../Parameters/Video@upScalingPatternList
    ("FullHeight", "FullWidth-TopBottomCrop-BlowUp",
    "FullSize-Anamorphic", "Artificial-FullSize-Anamorphic"...)

F I G. 3 2

(a) partialTransformability ATTRIBUTE
TranscodeDirective/.../Parameters/Video@partialTransformability (true OR false)
true: TRANSFORMABLE
false: NON-TRANSFORMABLE (b) deviationLimit ELEMENT
TranscodeDirective/.../Parameters/Video/DeviationLimit (deviation REPRESENTATION SCHEME IDENTIFICATION, VALUE)

(c) Parameters/Audio ELEMENT
TranscodeDirective/.../Parameters/Audio/ (VARIOUS Audio ATTRIBUTES)

(d) profileList ATTRIBUTE
TranscodeDirective/.../Parameters/Audio/profileList (profile NAME, profile NAME, ...)

(e) samplingRate ATTRIBUTE
TranscodeDirective/.../Parameters/Audio@samplingRate ("44.1k", "48k" ...)

(f) bitDepth ATTRIBUTE
TranscodeDirective/.../Parameters/Audio@bitDepth ("8", "16" ...)

(g) deviationLimit ELEMENT
TranscodeDirective/.../Parameters/Audio/DeviationLimit (deviation REPRESENTATION SCHEME IDENTIFICATION, VALUE)

FIG.33

```
<DeviationLimit schemeIdUri='urn:PSNR' value=35>
```

FIG.36
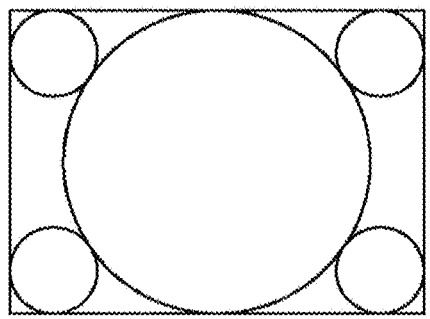
SDTV (4:3)
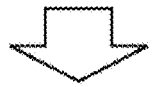
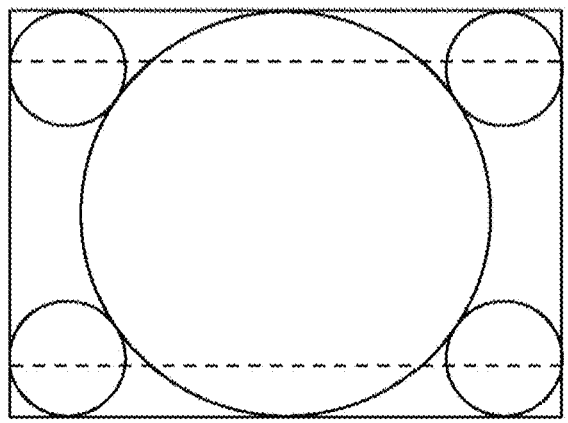
CROP TOP AND BOTTOM
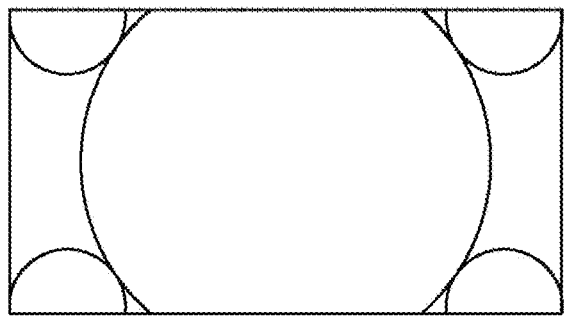
HDTV (16:9)

FIG.37
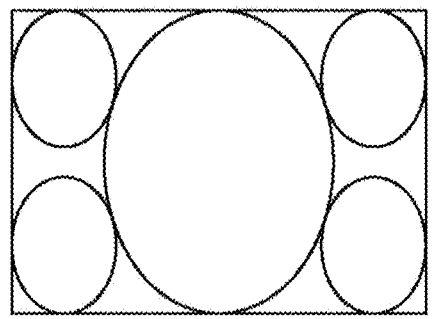
SDTV(4:3)
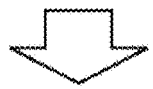
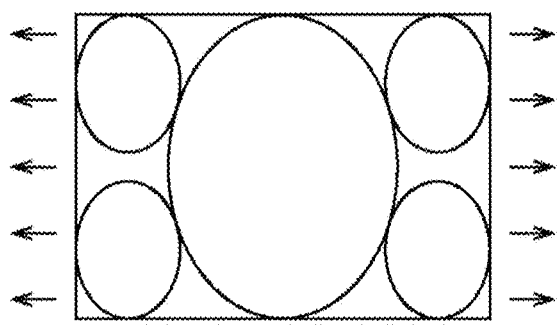
STRETCH TO LEFT AND RIGHT SIDES
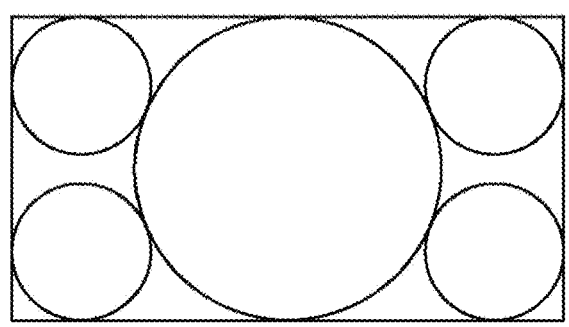
HDTV(16:9)

FIG.38
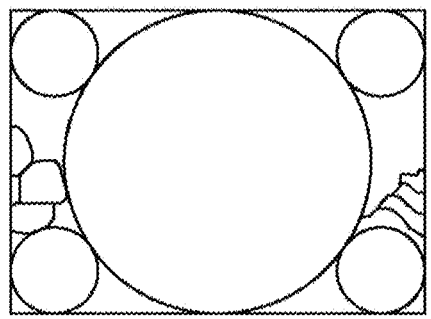
SDTV(4:3)
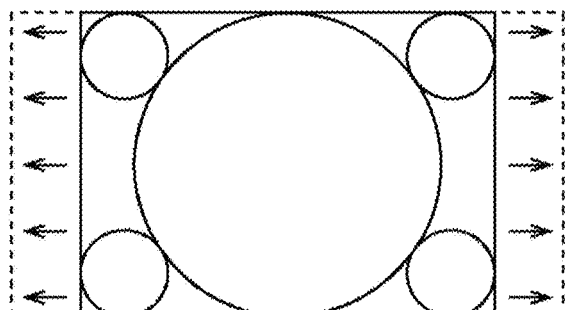
COMPLEMENT LEFT AND RIGHT
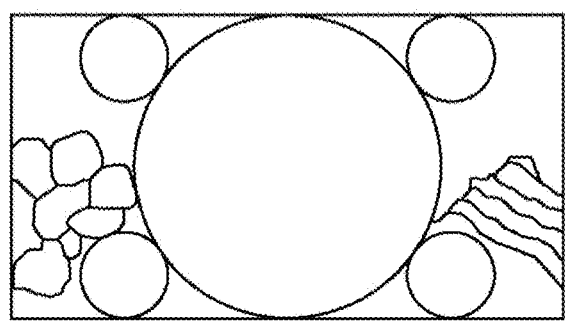
HDTV(16:9)

FIG. 41

| Parameter | | Type | Description |
|---|---|---|---|
| ViewportViews | | | List of reportable viewport views |
| | Entry | | |
| | sourceUrl | url | VR media sample source |
| | presentationTime | media-time | The presentation time of the media sample |
| | viewport | viewport | The viewed viewport | viewport specifies the region of omnidirectional media present at presentation Time. The sample format, Region On SphereStruct, as specified in ISO/IEC 23090-2 OMAF can be re-used here to specify viewport.

FIG. 42

| Key | | Type | Description |
|---|---|---|---|
| VRDeviceInfo | | | VR device related information |
| | Brand | string | Brand of the device |
| | Model | string | Model of the device |
| | OS | string | OS of the device along with the version infomation |
| | DisplayResolution | string | Display resolution of the device |
| | DisplayDensity | integer | Display pixel density in PPI |
| | DisplayRefreshRate | integer | Display refresh rate of the device |
| | Codec | set | Media Codec support |
| | Projection | set | Projection format support |
| | Packing | set | Region-wise packing support |
| | TrackingDistance | integer | Maximum 6DoF tracking range in millimeter |
| | TrackingPrecision | integer | Device sensor tracking precision in the unit of millidegree |
| | TrackingSensitivity | integer | Minimum 6DoF movement to be detected in millimeter for translation movement and millidegree for rotation movement |

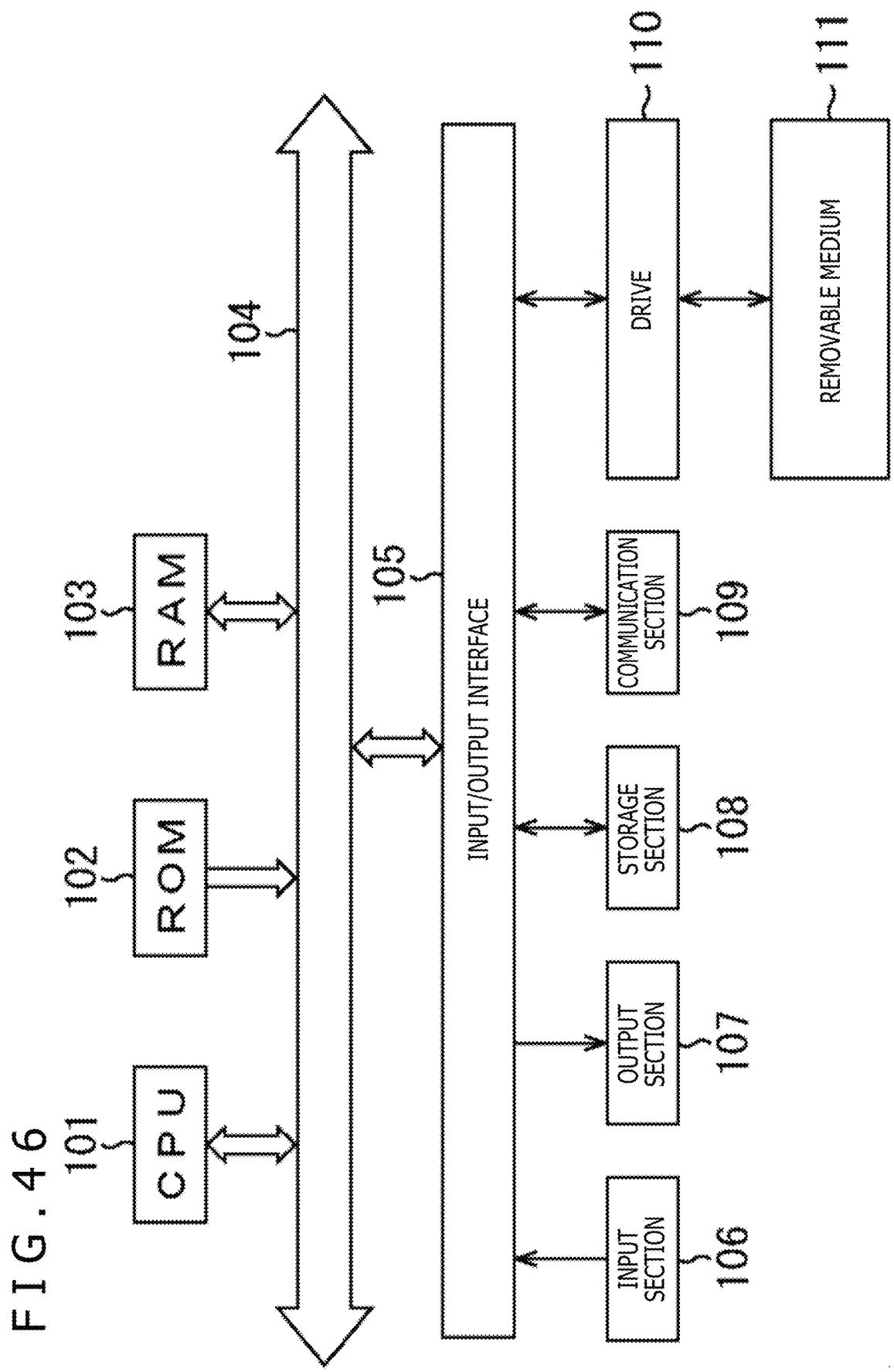

CONTENT DELIVERY CONTROL APPARATUS, CONTENT DELIVERY CONTROL METHOD, PROGRAM, AND CONTENT DELIVERY CONTROL SYSTEM

CROSS-REFERENCE TO RELATED APPLICATIONS

The present application is based on PCT filing PCT/JP2019/005189, filed Feb. 14, 2019, which claims priority to JP 2018-035082, filed Feb. 28, 2018, the entire contents of each are incorporated herein by reference.

TECHNICAL FIELD

The present disclosure relates to a content delivery control apparatus, a content delivery control method, a program, and a content delivery system, and particularly relates to a content delivery control apparatus, a content delivery control method, a program, and a content delivery system capable of achieving commonality of conditions associated with transcoding at the time of content delivery in different CDNs (Contents Delivery Networks) and supporting a standard upload interface.

BACKGROUND ART

As a trend of standardization in Internet streaming such as IPTV (Internet Protocol Television), standardization of an approach applied to VOD (Video On Demand) streaming and live streaming based on HTTP (Hypertext Transfer Protocol) streaming has been underway.

Attention has been paid particularly to MPEG-DASH (Dynamic Adaptive Streaming over HTTP) standardized in ISO/IEC/MPEG (refer to, for example, NPL 1).

MPEG-DASH is a technology for acquiring and reproducing streaming data in accordance with a metadata file called MPD (Media Presentation Description) and addresses (URLs: Uniform Resource Locators) of media data of chunked audio, video, subtitles, or the like described in the metadata file.

Furthermore, a study regarding a framework that is FLUS (Framework For Live Uplink Streaming) is currently underway in 3GPP (Third Generation Partnership Project) as an upload interface from stream capture devices to a cloud (refer to, for example, NPL 2 and NPL 3).

CITATION LIST

Patent Literature

[NPL 1]

ISO/IEC 23009-1:2012 Information technology Dynamic adaptive streaming over HTTP (DASH)

[NPL 2]

3GPP TS 26.238 V15.0.0 (2017 December) 3rd Generation Partnership Project; Technical Specification Group Services and System Aspects; Uplink Streaming (Release 15)

[NPL 3]

3GPP TS 26.114 V15.1.0(2017 December) 3rd Generation Partnership Project; Technical Specification Group Services and System Aspects; IP Multimedia Subsystem (IMS); Multimedia Telephony; Media handling and interaction (Release 15)

SUMMARY

Technical Problem

Meanwhile, there is a probability that a streaming content transitioning into a delivery phase is provided by causing, for example, an edge server (constituent element of the CDN) close to an end user to transcode the streaming content in accordance with stream reproduction environmental conditions of the end user. For example, at the time of transcoding, an original stream is decoded temporarily to a baseband stream and further encoded as a stream suited for a user's reproduction environment. At the time of conversion into this baseband, there is a probability that an edge server having remaining power performs various types of upscaling (upconversion) processing in accordance with the environmental conditions of the end user.

For example, there is a probability that optimal audio and pictures are created while taking into account an aspect ratio or a spatial resolution of a display of a device of the end user, characteristics of a reproducing instrument, and the like, and are encoded as a stream in accordance with a processing capability of a decoder. As creation of the optimal audio and pictures, it is supposed herein that sophisticated images or audios are added using not only upconversion in a simple linear extrapolation way but also, for example, AI (Artificial Intelligence) or the like. It is, however, required that whether or not this upscaling processing, creation of audio and pictures, or the like is permitted is controlled depending on an intention of a content provider (content owner) or a service provider (delivery service provider or the like). In other words, it is necessary to be capable of exercising delivery control as per the intention of the owner, servicer, or the like until the edge server in a delivery platform.

Meanwhile, standard metadata sharable among CDN services provided by various vendors and associated with stream reproducing control is not prepared under present circumstances. It is, therefore, required to achieve commonality of conditions associated with transcoding at the time of content delivery by describing various conditions associated with transcoding described above in a streaming manifest file such as a DASH-MPD (or HLS m3u8).

In other words, CDNs are provided by a plurality of vendors in general, and various types of control, policies, and the like associated with delivery of contents using a common manifest in the different CDNs are not standardized. Owing to this, it is necessary determine destinations and the like to, for example, report (collect logs of) constraints, conditions, and the like associated with transcoding.

Furthermore, with an increase in the number of use cases of delivering streams of, for example, UGC (User Generated Contents) contents, there is a probability of supporting a standard content upload interface (live streaming uplink) even in a delivery platform such as a video ecosystem.

It is, therefore, required to give support in such a manner as to be capable of declaring control over whether or not an edge server can transcode a streaming content transitioning into the delivery phase, and capable of collecting logs such as types and frequencies of transcoding to be executed and utilizing the collected logs for effective operations in accordance with such protocols. Furthermore, it is supposed that transcoding includes a case involving content modifications, and it is necessary to define an upload interface corresponding to such a case.

The present disclosure has been achieved in light of such circumstances, and an object of the present disclosure is to be capable of providing commonality of conditions associated with transcoding at the time of content delivery in different CDNs and supporting a standard upload interface.

Solution to Problem

A content delivery control apparatus according to one aspect of the present disclosure includes a receiving section that receives a metadata file at the time of delivering a content via a predetermined upload interface from a content delivery server that has a storage section configured to store the content and definition information necessary for transcoding the content, the metadata file storing therein the definition information or first access information for accessing the definition information and second access information for accessing an original stream that is original data generated from the content and that is delivered using an SDP, and a control section that exercises control associated with transcoding of the original stream acquired on the basis of the second access information. The control section controls the transcoding of the original stream on the basis of the definition information in a case in which the definition information is stored in the metadata file, and the control section requests the definition information on the basis of the first access information and controls the transcoding of the original stream on the basis of the definition information received by the receiving section in response to the request in a case in which the first access information is stored in the metadata file.

A content delivery control method according to one aspect of the present disclosure includes, by a content delivery control apparatus including a receiving section that receives a metadata file at the time of delivering a content via a predetermined upload interface from a content delivery server that has a storage section configured to store the content and definition information necessary for transcoding the content, the metadata file storing therein the definition information or first access information for accessing the definition information and second access information for accessing an original stream that is original data generated from the content and that is delivered using an SDP, and a control section that exercises control associated with transcoding of the original stream acquired on the basis of the second access information, causing the control section to control the transcoding of the original stream on the basis of the definition information in a case in which the definition information is stored in the metadata file, and causing the control section to request the definition information on the basis of the first access information and to control the transcoding of the original stream on the basis of the definition information received by the receiving section in response to the request in a case in which the first access information is stored in the metadata file.

A program according to one aspect of the present disclosure causes a computer of a content delivery control apparatus including a receiving section that receives a metadata file at the time of delivering a content via a predetermined upload interface from a content delivery server that has a storage section configured to store the content and definition information necessary for transcoding the content, the metadata file storing therein the definition information or first access information for accessing the definition information and second access information for accessing an original stream that is original data generated from the content and that is delivered using an SDP, and a control section that exercises control associated with transcoding of the original stream acquired on the basis of the second access information, to execute processing including causing the control section to control the transcoding of the original stream on the basis of the definition information in a case in which the definition information is stored in the metadata file, and causing the control section to request the definition information on the basis of the first access information and to control the transcoding of the original stream on the basis of the definition information received by the receiving section in response to the request in a case in which the first access information is stored in the metadata file.

A content delivery system according to one aspect of the present disclosure includes a first server that has a storage section configured to store a content and definition information necessary for transcoding the content, a second server that exercises content delivery control, and a client that acquires and reproduces the content delivered in accordance with the content delivery control. The second server includes a receiving section that receives a metadata file at the time of delivering the content via a predetermined upload interface from the first server, the metadata file storing therein the definition information or first access information for accessing the definition information and second access information for accessing an original stream that is original data generated from the content and that is delivered using an SDP, and a control section that exercises control associated with transcoding of the original stream acquired on the basis of the second access information. The control section controls the transcoding of the original stream on the basis of the definition information in a case in which the definition information is stored in the metadata file. The control section requests the definition information on the basis of the first access information and controls the transcoding of the original stream on the basis of the definition information received by the receiving section in response to the request in a case in which the first access information is stored in the metadata file.

In one aspect of the present disclosure, a metadata file is received at the time of delivering a content via a predetermined upload interface from a content delivery server that has a storage section configured to store the content and definition information necessary for transcoding the content, the metadata file storing therein the definition information or first access information for accessing the definition information and second access information for accessing an original stream that is original data generated from the content and that is delivered using an SDP, and control associated with transcoding of the original stream acquired on the basis of the second access information is exercised. Furthermore, the transcoding of the original stream is controlled on the basis of the definition information in a case in which the definition information is stored in the metadata file. Meanwhile, the definition information is requested on the basis of the first access information and the transcoding of the original stream is controlled on the basis of the definition information received in response to the request in a case in which the first access information is stored in the metadata file.

Advantageous Effect of Invention

According to one aspect of the present disclosure, it is possible to provide commonality of conditions associated with transcoding at the time of content delivery in different CDNs and support a standard upload interface.

It is noted that advantages are not always limited to those described herein but may be any of the advantages described in the present disclosure.

BRIEF DESCRIPTION OF DRAWINGS

FIG. 5 is an explanatory diagram of details of protocols used in content delivery processing.

Figure 6:
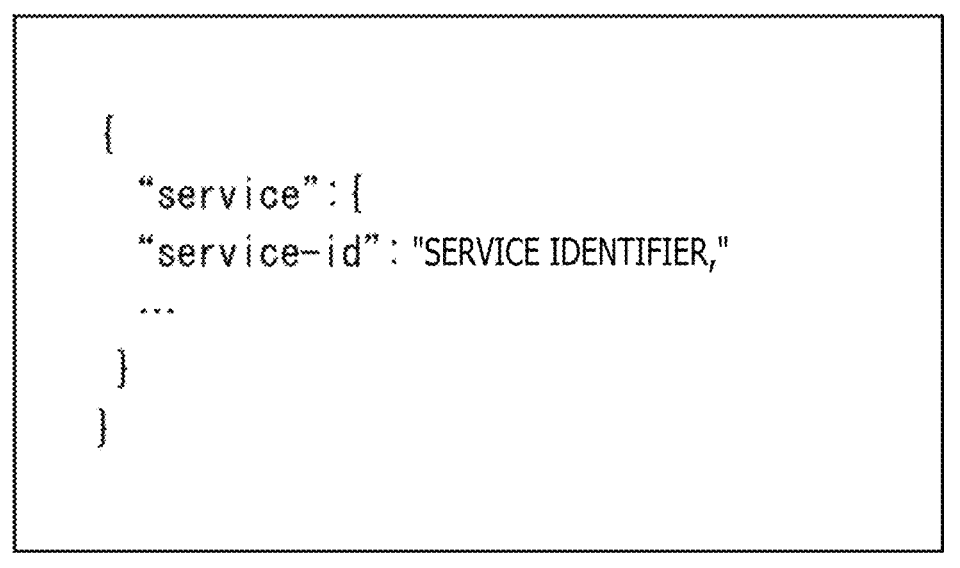

FIG. 6 is a diagram depicting an example of a ServiceResource.

FIG. 7 is a diagram depicting an example of a SessionResource.

FIG. 8 is a diagram depicting an example of ""information for FLUS sink to acquire (by Push/Pull) stream from FLUS source"."

FIG. 9 is a diagram depicting an example of an SDP in ""URL of SDP of session stream concerned"."

FIG. 10 is a diagram depicting another example of the SDP in ""URL of SDP of session stream concerned"."

FIG. 11 is an explanatory diagram of details of protocols used in content delivery processing.

FIG. 24 is a diagram depicting an example of disposing a TranscodeDirective element in a DASH-MPD.

FIG. 25 is a diagram depicting a variation of an example of disposing the TranscodeDirective element in a DASH-MPD.

FIG. 26 is an explanatory diagram of a transcodable attribute, an upScalable attribute, a processingLimit attribute, an Allowed element, a Prohibited element, and a Condition element.

FIG. 27 is a diagram depicting an example of storing a condition description in a CDATA section of a content part of the Condition element.

FIG. 28 is a diagram depicting an example of an ODRL description.

FIG. 29 is an explanatory diagram of a TranscodeEventNotification element, a dateTime attribute, an MPDUrl attribute, an AdaptationSetId attribute, and a notificationUrl attribute.

FIG. 30 is a diagram depicting an example of the TranscodeDirective element.

FIG. 31 is an explanatory diagram of a Parameters/Video element, a profile attribute, a resolution attribute, a frameRate attribute, a bitDepth attribute, a colorSpace attribute, a gamma attribute, and an upScalingPatternList attribute.

FIG. 32 is an explanatory diagram of a partialTransformability attribute, a deviationLimit element, a Parameters/Audio element, a profileList attribute, a samplingRate attribute, a bitDepth attribute, and a deviationLimit element.

FIG. 33 is a diagram depicting an example of storing a value in a value attribute.

FIG. 36 is a diagram depicting an example of upscaling (FullWidth-TopBottomCrop-BlowUp).

FIG. 37 is a diagram depicting an example of upscaling (FullSize-Anamorphic).

FIG. 38 is a diagram depicting an example of upscaling (Artificial-FullSize-Anamorphic).

FIG. 41 is a diagram depicting an example of the viewport notification.

FIG. 42 is a diagram depicting an example of device attributes.

FIG. 46 is a block diagram depicting an example of a configuration of one embodiment of a computer to which the present technology is applied.

DESCRIPTION OF EMBODIMENTS

Specific embodiments to which the present technology is applied will be described in detail hereinafter with reference to the drawings.

<First and Second Examples of Configuration of Content Delivery System>

Figure 1:
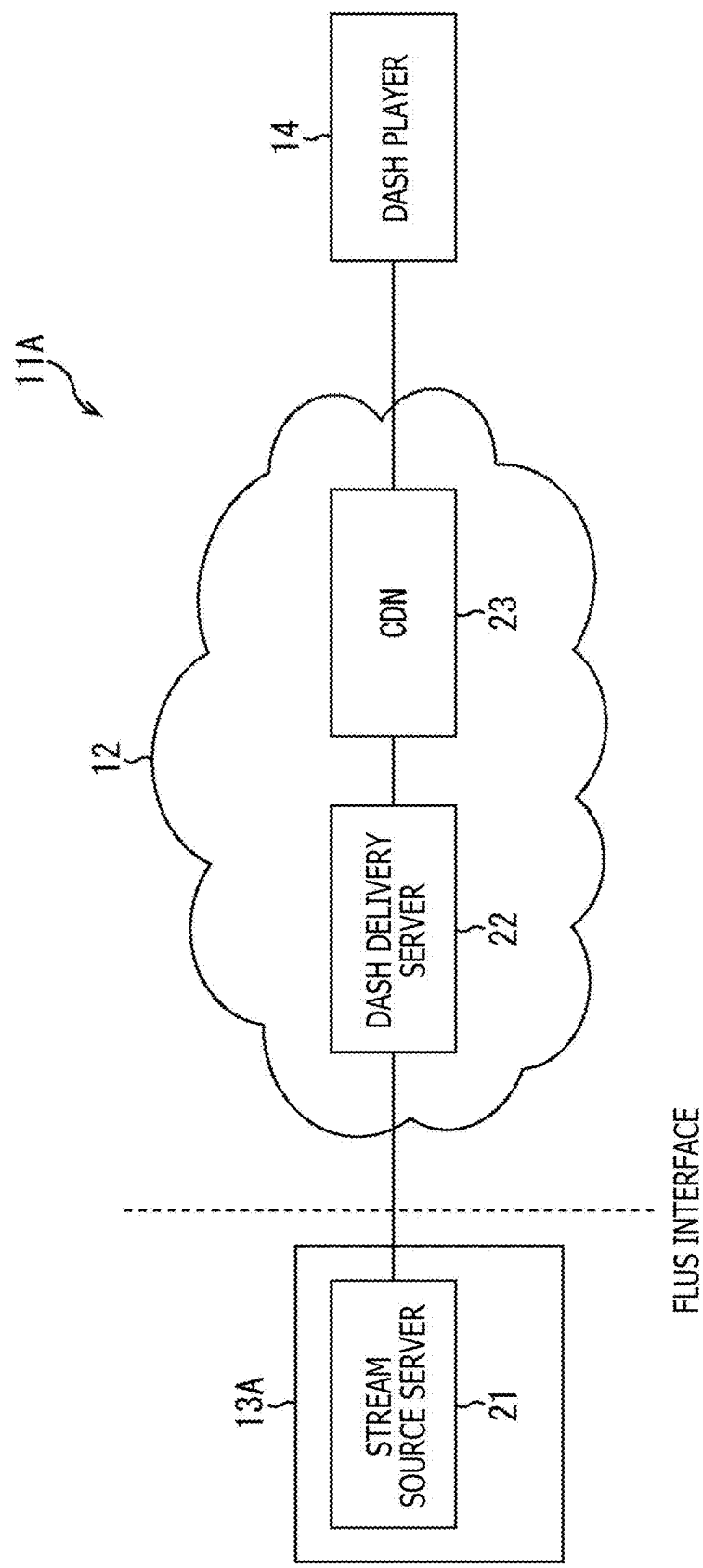
FIG. 1 is a block diagram depicting an example of a configuration of a first embodiment of a content delivery system to which the present technology is applied.

FIG. 1 is a block diagram depicting an example of a configuration of a first embodiment of a content delivery system to which the present technology is applied, and FIG.

2 is a block diagram depicting an example of a configuration of a second embodiment of a content delivery system to which the present technology is applied.

A content delivery system 11A depicted in FIG. 1 is configured, for example, such that a content providing apparatus 13A and a DASH player 14 are connected to cloud computing (hereinafter, referred to as "cloud") 12 providing various services via the Internet. In addition, in the content delivery system 11A, a content delivered from a stream source server 21 provided in the content providing apparatus 13A is provided to the DASH player 14 via a CDN 23 constructed by a plurality of CDN servers on the cloud 12 by way of a DASH delivery server 22 on the cloud 12.

Figure 2:
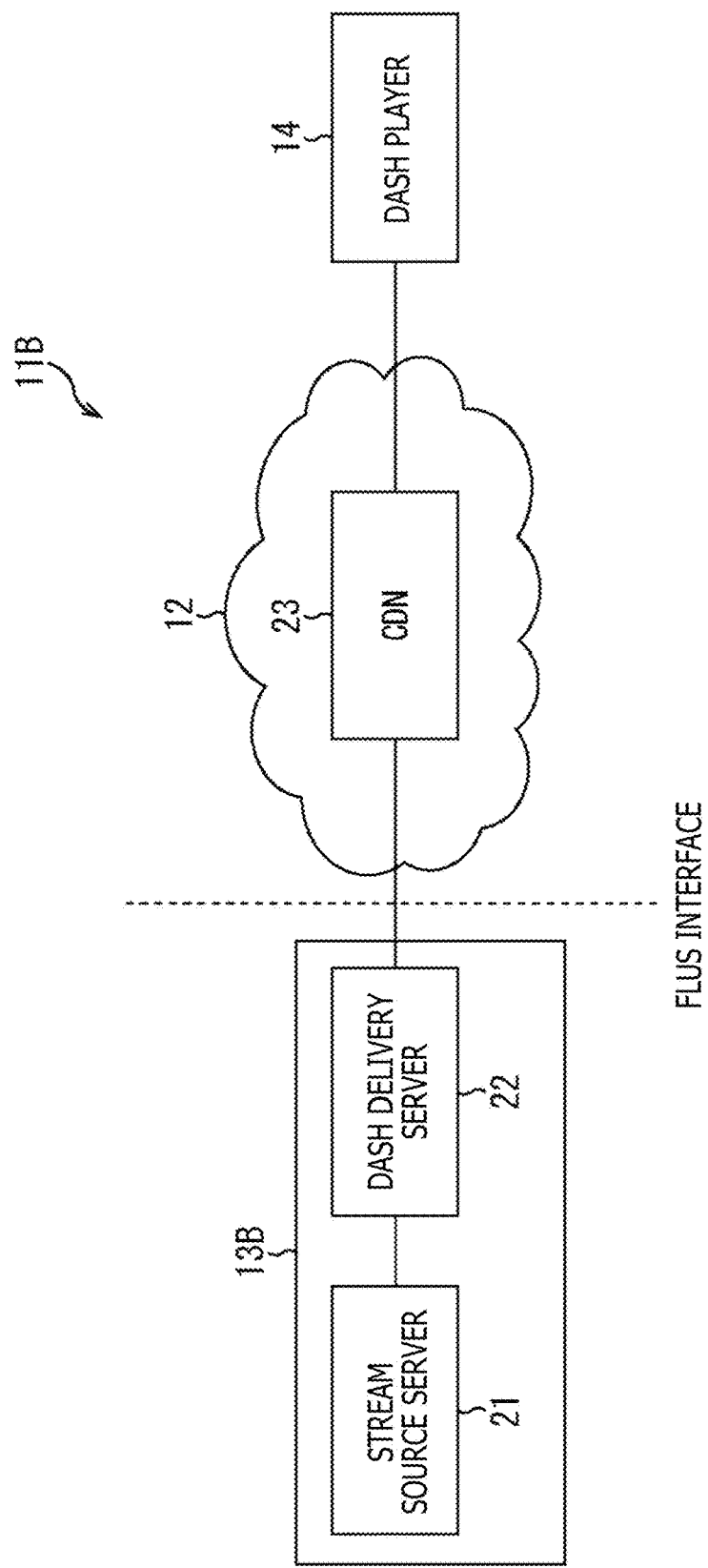
FIG. 2 is a block diagram depicting an example of a configuration of a second embodiment of a content delivery system to which the present technology is applied.

Similarly to the content delivery system 11A, a content delivery system 11B depicted in FIG. 2 is configured such that a content providing apparatus 13B and the DASH player 14 are connected to the cloud 12. In addition, in the content delivery system 11B, a content delivered from the stream source server 21 provided in the content providing system 13B by way of the DASH delivery server 22 is provided to the DASH player 14 via the CDN 23 constructed by the plurality of CDN servers on the cloud 12.

In other words, the content delivery system 11A of FIG. 1 is configured such that the DASH delivery server 22 is provided on the cloud 12 separately from the content providing apparatus 13A configured with the stream source server 21. On the other hand, the content delivery system 11B of FIG. 2 is configured such that the content providing apparatus 13A configured with the stream source server 21 is also configured with the DASH delivery server 22.

The content providing apparatuses 13A and 13B are each an input apparatus (stream capture device) which is, for example, a so-called smartphone and a digital camera and to which a content is input.

The DASH player 14 is an output apparatus which is, for example, a so-called smartphone, a tablet, a personal computer, a television receiver, a game instrument, and a head mounted display and which reproduces and outputs a content.

The stream source server 21 has a storage section that stores a delivered content in the content delivery system 11A or 11B and reads a content requested by, for example, the DASH player 14 to deliver the content from the storage section and delivers the content.

The DASH delivery server 22 has at least an encoder, a DASH segmenter, and an MPD generator and can encode a content delivered in the content delivery system 11A or 11B and generate a segment and generate an MPD in accordance with MPEG-DASH.

The CDN 23 is configured in a multistage fashion by the plurality of CDN servers (such as a CDN origin server 41a, a CDN relay server, and a CDN edge server 41b to be described later) and constructs an optimized network for content delivery.

It is noted that a framework that is the FLUS (refer to NPL 2 and NPL 3 described above) is used for an upload interface from the content providing apparatus 13A or 13B to the cloud 12. In other words, as depicted in FIG. 1, a FLUS interface is used between the stream source server 21 and the DASH delivery server 22 in the content delivery system 11A, and the DASH delivery server 22, for example, acquires the segment and the MPD via the FLUS interface. In addition, as depicted in FIG. 2, the FLUS interface is used between the DASH delivery server 22 and the CDN 23 in the content delivery system 11B, and the CDN 23, for example, acquires the segment and the MPD via the FLUS interface.

<Content Delivery Processing Via FLUS Interface>

A system configuration of the FLUS interface in the content providing apparatus 13A of FIG. 1 will be described with reference to FIG. 3.

In the content providing apparatus 13A, the content providing apparatus 13A configured with the stream source server 21 serves as a FLUS source, and a FLUS sink is provided on the cloud 12 configured with the DASH delivery server 22. Description will be given herein on the assumption that the stream source server 21 and the DASH delivery server 22 perform processing associated with FLUS media and that FLUS controllers provided by the content providing apparatus 13A and the cloud 12 perform processing associated with FLUS control.

In Step S11, the FLUS controller of the content providing apparatus 13A requests Authentication or Authorization, and Authentication or Authorization parameters are transmitted from the content providing apparatus 13A to the cloud 12.

Upon receiving the Authentication or Authorization parameters transmitted in Step S11, the FLUS controller of the cloud 12 returns Authentication or Authorization. An AccessToken indicating that a right to access services is given is thereby transmitted from the cloud 12 to the content providing apparatus 13A.

Upon receiving the AccessToken transmitted in Step S12, the FLUS controller of the content providing apparatus 13A requests Service establishment in Step S13, and an AccessToken is transmitted from the content providing apparatus 13A to the cloud 12. It is noted herein that the AccessToken is transmitted in this way for the purpose of proving that the AccessToken is assigned to a message of requesting the Service establishment and that the right to access services is given. It is noted that an AccessToken to be transmitted in each of subsequent steps is used for a similar purpose in each processing.

Upon receiving the AccessToken transmitted in Step S13, the FLUS controller of the cloud 12 returns Service establishment in Step S14. A ServiceID of a Service established in the cloud 12 is thereby transmitted from the cloud 12 to the content providing apparatus 13A.

Upon receiving the ServiceID transmitted in Step S14, the FLUS controller of the content providing apparatus 13A requests a ServiceResource in Step S15. An AccessToken and the ServiceID are thereby transmitted from the content providing apparatus 13A to the cloud 12.

Upon receiving the AccessToken and the ServiceID transmitted in Step S15, the FLUS controller of the cloud 12 returns the ServiceResource in Step S16. The ServiceResource is thereby transmitted from the cloud 12 to the content providing apparatus 13A.

Upon receiving the ServiceResource transmitted in Step S16, the FLUS controller of the content providing apparatus 13A updates the ServiceResource to the received ServiceResource in Step S17 in the case of subsequent need to change attributes of the Service itself. In addition, an AccessToken, the ServiceID, and the ServiceResource are transmitted from the content providing apparatus 13A to the cloud 12.

Upon receiving the AccessToken, the ServiceID, and the ServiceResource transmitted in Step S17, the FLUS controller of the cloud 12 returns an ACK indicating success in receiving the AccessToken, the ServiceID, and the ServiceResource in Step S18.

Upon receiving the ACK in Step S18, the FLUS controller of the content providing apparatus 13A requests Session establishment in Step S19. An AccessToken is thereby transmitted from the content providing apparatus 13A to the cloud 12.

Upon receiving the AccessToken transmitted in Step S19, the FLUS controller of the cloud 12 returns Session establishment in Step S20. A SessionID of a Session established on the cloud 12 is thereby transmitted from the cloud 12 to the content providing apparatus 13A.

Upon receiving the SessionID transmitted in Step S20, the FLUS controller of the content providing apparatus 13A requests a SessionResource in Step S21. An AccessToken and the ServiceID are thereby transmitted from the content providing apparatus 13A to the cloud 12.

Upon receiving the AccessToken and the ServiceID transmitted in Step S21, the FLUS controller of the cloud 12 returns the SessionResource in Step S22. The SessionResource is thereby transmitted from the cloud 12 to the content providing apparatus 13A.

Upon receiving the SessionResource transmitted in Step S22, the FLUS controller of the content providing apparatus 13A updates the SessionResource to the received SessionResource in Step S23. In addition, an AccessToken, the ServiceID, and the SessionResource are transmitted from the content providing apparatus 13A to the cloud 12.

Upon receiving the AccessToken, the ServiceID, and the SessionResource transmitted in Step S23, the FLUS controller of the cloud 12 returns an ACK indicating success in receiving the AccessToken, the ServiceID, and the SessionResource in Step S24.

The stream source server 21 then starts transferring a stream and metadata and transmits a Stream and Metadata together with an AccessToken and the SessionID in Step S25. At this time, the stream source server 21 can also notify the DASH delivery server 22 of TranscodeDirective of the Stream concerned by storing similar contents to those notified by storing the contents in the SessionResource updated in Step S23 in the Metadata.

Upon receiving the Stream and the Metadata together with the AccessToken and the SessionID transmitted in Step S25, the DASH delivery server 22 returns an ACK indicating success in receiving the Stream, the Metadata, and the like in Step S26.

Subsequently, similar processing to Steps S25 and S26 is repeatedly performed between the stream source server 21 and the DASH delivery server 22 until end of delivery of the stream.

Furthermore, after end of delivery of the stream, the FLUS controller of the content providing apparatus 13A requests Session release in Step S27. An AccessToken and the SessionID are thereby transmitted from the content providing apparatus 13A to the cloud 12.

Upon receiving the AccessToken and the SessionID transmitted in Step S27, the FLUS controller of the cloud 12 returns an ACK indicating success in receiving the AccessToken and the SessionID in Step S18. The FLUS controller of the cloud 12 performs processing for releasing the Session in response to this request.

Upon receiving the ACK in Step S28, the FLUS controller of the content providing apparatus 13A requests Service release in Step S29. An AccessToken and the ServiceID are thereby transmitted from the content providing apparatus 13A to the cloud 12.

Upon receiving the AccessToken and the ServiceID transmitted in Step S29, the FLUS controller of the cloud 12 returns an ACK indicating success in receiving the AccessToken and the ServiceID in Step S30. The FLUS controller of the cloud 12 performs processing for releasing the Service in response to this request and ends the processing when the FLUS controller of the content providing server 13A receives the ACK.

As described so far, either the FLUS controller of the content providing apparatus 13A updates contents of the SessionResource transmitted from the FLUS controller of the cloud 12 and transmits the updated contents to the FLUS controller of the cloud 12, or the stream source server 21 transmits the Metadata to the DASH delivery server 22 of the cloud 12, so that the FLUS source can notify the FLUS sink of the TranscodeDirective of the Stream concerned.

Figure 4:
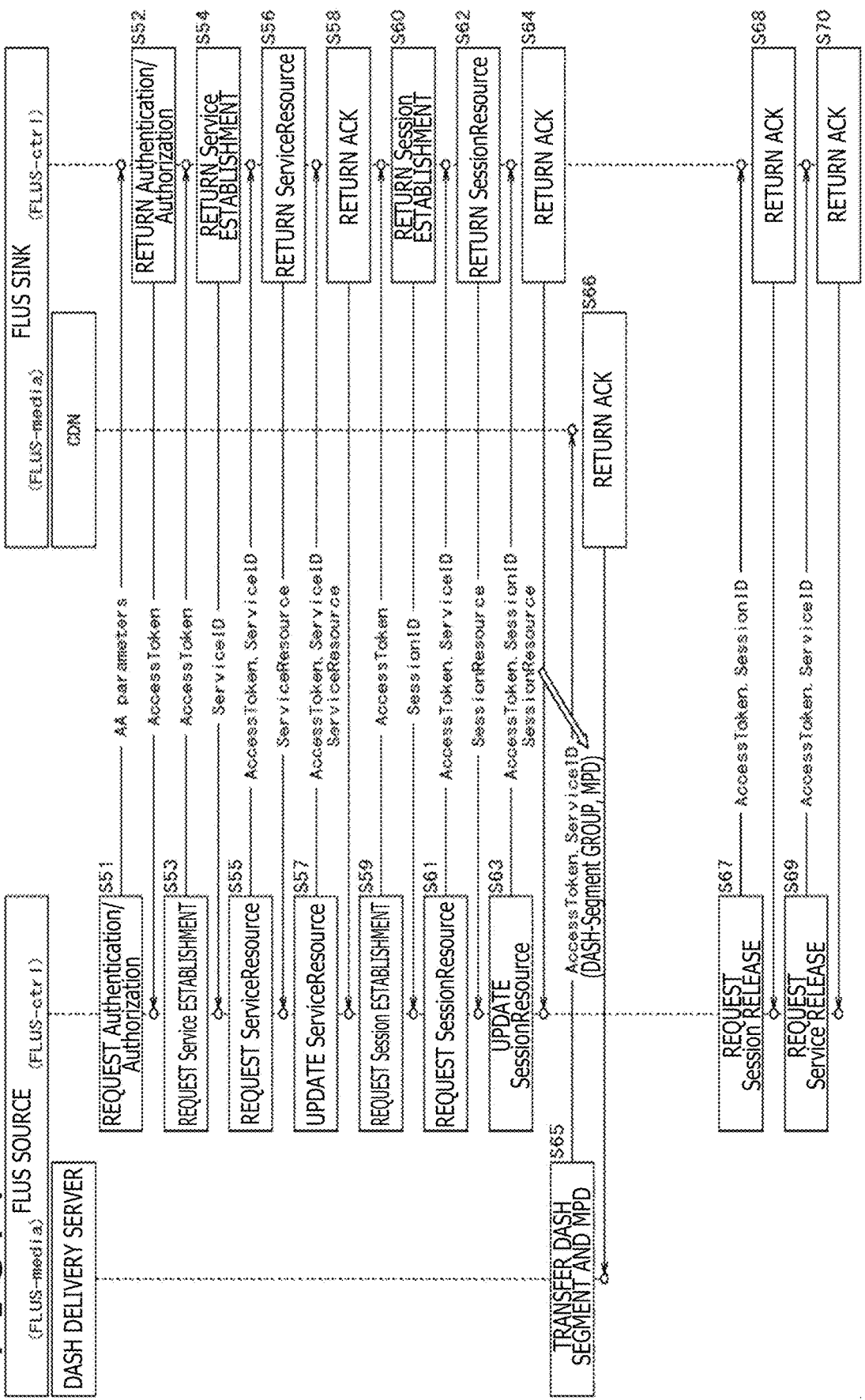
FIG. 4 is an explanatory diagram of a system configuration of a FLUS interface in the example of the configuration of FIG. 2.

A system configuration of the FLUS interface in the content providing apparatus 13B of FIG. 2 will be described with reference to FIG. 4.

In the content providing apparatus 13B, the content providing apparatus 13B configured with the DASH delivery server 22 serves as a FLUS source, and a FLUS sink is provided on the CDN 23 configured with the DASH delivery server 22. Description will be given herein on the assumption that the DASH delivery server 22 and the CDN 23 perform processing associated with FLUS media, and that FLUS controllers provided by the content providing apparatus 13B and the cloud 12 perform processing associated with FLUS control.

Figure 3:
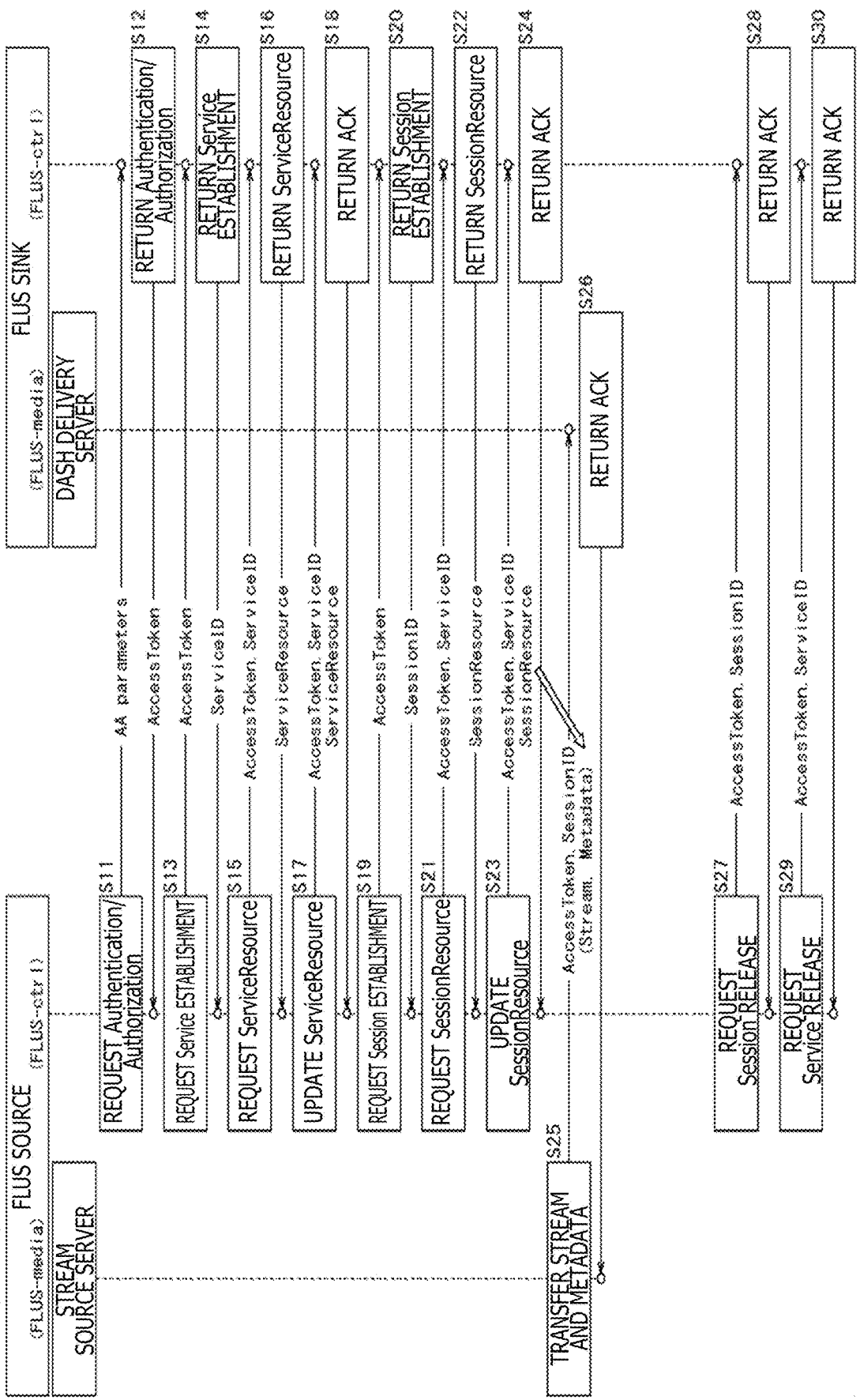
FIG. 3 is an explanatory diagram of a system configuration of a FLUS interface in the example of the configuration of FIG. 1.

In Steps S51 to S64, similar processing to that in Steps S11 to S24 of FIG. 3 is performed between the FLUS controllers of the content providing apparatus 13B and the cloud 12.

In Step S65, the DASH delivery server 22 then starts transferring the DASH segment and the MPD.

Subsequently, the DASH delivery server 22 starts transferring the DASH segment and the MPD and transmits a DASH-Segment group and the MPD together with an AccessToken and the SessionID in Step S65. At this time, the DASH delivery server 22 can also notify the CDN 23 of TranscodeDirective of the DASH-Segment concerned by storing similar contents to those notified by storing the contents in the SessionResource updated in Step S63 in the MPD.

Upon receiving the AccessToken, the SessionID, the DASH-Segment group, and the MPD transmitted in Step S65, the CDN 23 returns an ACK indicating success in receiving the AccessToken and the like in Step S66.

Similar processing to Steps S65 and S66 is repeatedly performed hereinafter between the DASH delivery server 22 and the CDN 23 until end of delivery of the stream.

Furthermore, after end of delivery of the stream, similar processing to that in Steps S27 to S30 of FIG. 3 is performed between the FLUS controllers of the content providing apparatus 13B and the cloud 12 in Steps S67 to S70.

As described so far, either the FLUS controller of the content providing apparatus 13B updates contents of the SessionResource transmitted from the FLUS controller of the cloud 12 and transmits the updated contents to the FLUS controller of the cloud 12, or the DASH delivery server 22 transmits the MPD to the CDN 23 of the cloud 12, so that the FLUS source can notify the FLUS sink of the TranscodeDirective of the DASH-Segment concerned.

<Detailed Example of Protocols>

Details of protocols used in content delivery processing of FIGS. 3 and 4 will be described with reference to FIGS. 5 to 11. For example, API is implemented by RESTful API (call interface for HTTP of a Web system constructed to comply with a REST principle).

As depicted in (a) of FIG. 5, in the request of Service establishment (Step S13 of FIG. 3 and Step S53 of FIG. 4), the FLUS source transmits an HTTP method, for example, HTTP POST for transmitting data from the FLUS source, to the FLUS sink. At this time, the ServiceResource, for example, is stored in a body part.

In addition, in a response to the request (Step S14 of FIG. 3 and Step S54 of FIG. 4), the FLUS sink transmits an HTTP status code, for example, HTTP 201 CREATED for indicating creation of a new resource as a result of success in the request of Service establishment, to the FLUS source. At this time, a url of the ServiceResource updated in the FLUS sink, for example, is stored in a location header. Furthermore, as in the example of the ServiceResource depicted in FIG. 6, in the case of success in Service establishment, a value allocated to a service-id (ServiceID) of the ServiceResource generated in the FLUS sink is stored therein.

As depicted in (b) of FIG. 5, in a request of the ServiceResource (Step S15 of FIG. 3 and Step S55 of FIG. 4), the FLUS source transmits an HTTP method, for example, HTTP GET for requesting information designated by the url, to the FLUS sink. At this time, by the HTTP GET, the url of the ServiceResource returned as a response to Service establishment and updated by the FLUS sink is designated.

In addition, in a response to the request (Step S16 of FIG. 3 and Step S56 of FIG. 4), the FLUS sink transmits an HTTP status code, for example, HTTP 200 OK for indicating success in the request of the ServiceResource, to the FLUS source. At this time, the ServiceResource concerned is stored in a body part.

As depicted in (c) of FIG. 5, in an update of the ServiceResource (Step S17 of FIG. 3 and Step S57 of FIG. 4), the FLUS source transmits an HTTP method, for example, HTTP PUT for replacing a file on a server designated by the url, to the FLUS sink. At this time, the ServiceResource updated in the FLUS source is stored in a body part.

In addition, in a response to the update (Step S18 of FIG. 3 and Step S58 of FIG. 4), the FLUS sink transmits an HTTP status code, for example, HTTP 200 OK for indicating success in updating the ServiceResource, to the FLUS source. At this time, in the case of success in updating the ServiceResource, the url of the ServiceResource updated in the FLUS sink is stored in a location header.

As depicted in (d) of FIG. 5, in a request of Session establishment (Step S19 of FIG. 3 and Step S59 of FIG. 4), the FLUS source transmits an HTTP method, for example, HTTP POST for transmitting data from the FLUS source, to the FLUS sink. At this time, the SessionResource, for example, is stored in a body part.

In addition, in a response to the request (Step S20 of FIG. 3 and Step S60 of FIG. 4), the FLUS sink transmits an HTTP status code, for example, HTTP 201 CREATED for indicating creation of a new resource as a result of success in the request of Service establishment, to the FLUS source. At this time, the url of the ServiceResource updated in the FLUS sink, for example, is stored in the location header. Furthermore, as in the example of the SessionResource depicted in FIG. 7, in the case of success in Session establishment, a value assigned to a Sessione-id (SessionID) of the SessionResource generated in the FLUS sink is stored therein.

As depicted in FIG. 7, herein, ""information for FLUS sink to acquire (by Push/Pull) stream from FLUS source"" is described in the SessionResource, and FIG. 8 depicts an example of the information.

As depicted in FIG. 8, as this information, ""URL of MPD of session stream concerned"" is described in the case of Pull acquisition, and ""URL of SDP (Session Description Protocol) of session stream concerned"" is described in the case of Push acquisition.

Moreover, FIG. 9 depicts an example of the SDP in ""URL of SDP (Session Description Protocol) of session stream concerned"" depicted in FIG. 8. For example, at the time of delivery of a stream using the SDP, a new session attribute a=transcodeDirective is introduced such that the TranscodeDirective can be disposed in a part of a session attribute description of a video.

Furthermore, in the case of storing a URL of a TranscodeDirective information structure (file) as a variation of "a=transcodeDirective:"contents of TranscodeDirective (base64 encoded character string of TranscodeDirective described in XML)"" depicted in FIG. 9, "a=transcodeDirective:"URL of TranscodeDirective (URL of TranscodeDirective file described in XML)"" is described.

While FIG. 9 depicts an example of using a SDP file standardized and defined in an IETF (Internet Engineering Task Force) as the metadata file and storing the TranscodeDirective in a media description portion of a media session concerned of the SDP, the TranscodeDirective may be stored in the SessionResource concerned of the FLUS as a variation of this example as depicted in FIG. 10. Furthermore, as a variation thereof, a url of the file is sometimes stored therein.

As depicted in (a) of FIG. 11, in a request of the SessionResource (Step S21 of FIG. 3 and Step S61 of FIG. 4), the FLUS source transmits an HTTP method, for example, HTTP GET for requesting information designated by the url, to the FLUS sink. At this time, by the HTTP GET, the url of the SessionResource returned as a response to Session establishment and updated in the FLUS sink is designated.

In addition, in a response to the request (Step S22 of FIG. 3 and Step S62 of FIG. 4), the FLUS sink transmits an HTTP status code, for example, HTTP 200 OK for indicating success in the request of the SessionResource, to the FLUS source. At this time, the SessionResource concerned is stored in a body part.

As depicted in (b) of FIG. 11, in an update of the SessionResource (Step S23 of FIG. 3 and Step S63 of FIG. 4), the FLUS source transmits an HTTP method, for example, HTTP PUT for replacing a file on a server designated by the url, to the FLUS sink. At this time, the SessionResource updated in the FLUS source is stored in a body part.

In addition, in a response to the request (Step S24 of FIG. 3 and Step S64 of FIG. 4), the FLUS sink transmits an HTTP status code, for example, HTTP 200 OK for indicating success in updating the SessionResource, to the FLUS source. At this time, in the case of success in updating the Service, the url of the SessionResource updated in the FLUS sink is stored in a location header.

As depicted in (c) of FIG. 11, in a release of the Session (Step S27 of FIG. 3 and Step S67 of FIG. 4), the FLUS source transmits an HTTP method, for example, HTTP DELETE for deleting a file on the server designated by the url, to the FLUS sink. At this time, the url of the SessionResource is designated by HTTP DELETE.

In addition, in a response to the release (Step S28 of FIG. 3 and Step S68 of FIG. 4), the FLUS sink transmits an HTTP status code, for example, HTTP 200 OK for indicating success in releasing the Session, to the FLUS source. At this time, in the case of success in releasing the Session, the url of the released SessionResource is stored in a location header.

As depicted in (d) of FIG. 11, in a release of the Service (Step S29 of FIG. 3 and Step S69 of FIG. 4), the FLUS source transmits an HTTP method, for example, HTTP DELETE for deleting a file on the server designated by the url, to the FLUS sink. At this time, the url of the ServiceResource is designated by HTTP DELETE.

In addition, in a response to the release (Step S30 of FIG. 3 and Step S70 of FIG. 4), the FLUS sink transmits an HTTP status code, for example, HTTP 200 OK for indicating success in releasing the Service, to the FLUS source. At this time, in the case of success in releasing the Service, the url of the released ServiceResource is stored in a location header.

<Example of Configuration of Each Block in Content Delivery System>

An example of configurations of blocks configuring a content delivery system 11 will be described with reference to FIGS. 12 to 17. It is noted that the content delivery system 11 depicted in FIG. 12 corresponds to the configuration of any of the content delivery system 11A of FIG. 1 and the content delivery system 11B of FIG. 2. In other words, with the configuration of the content delivery system 11A, the FLUS interface is used between the stream source server 21 and the DASH delivery server 22, and with the configuration of the content delivery system 11B, the FLUS interface is used between the DASH delivery server 22 and CDNs 23-1 and 23-2.

Figure 12:
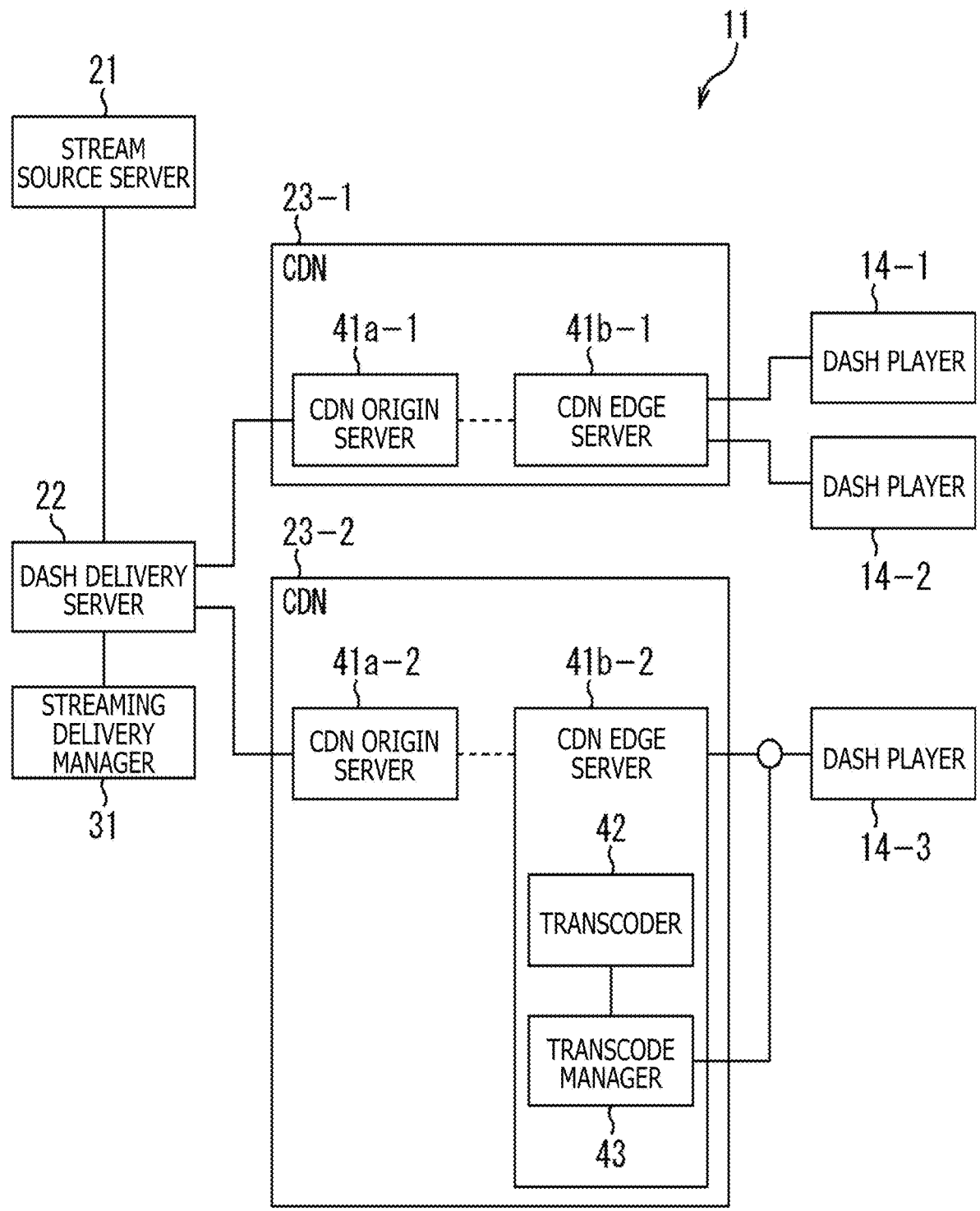
FIG. 12 is a block diagram depicting an example of a detailed configuration of a content delivery system.

As depicted in FIG. 12, in the content delivery system 11, the DASH delivery server 22 is connected to the stream source server 21, and a streaming delivery manager 31 is connected to the DASH delivery server 22. For example, the DASH delivery server 22 supplies an original MPD to the streaming delivery manager 31, and the streaming delivery manager 31 returns the MPD to which the TranscodeDirective is added to the DASH delivery server 22.

Furthermore, in the content delivery system 11 depicted in FIG. 12, an example of delivering contents using the CDNs 23-1 and 23-2 provided by two vendors is depicted, and each of the CDNs 23-1 and 23-2 is configured with multistage CDN servers 41. In addition, the DASH delivery server 22 transmits the MPD and segment to each of a CDN origin server 41a-1 of the CDN 23-1 and a CDN origin server 41a-2 of the CDN 23-2.

The CDN 23-1 is configured with the CDN origin server 41a-1, multistage CDN relay servers, not depicted, and a CDN edge server 41b-1. The MPD and the segment supplied from the DASH delivery server 22 to the CDN origin server 41a-1 arrive at the CDN edge server 41b-1 via the multistage CDN relay servers, not depicted. Furthermore, the CDN edge server 41b-1 transmits the MPD and the segment to each of DASH players 14-1 and 14-2, where the content is reproduced.

The CDN 23-2 is configured with the CDN origin server 41a-2, multistage CDN relay servers, not depicted, and a CDN edge server 41b-2, and the CDN edge server 41b-2 has a transcoder 42 and a transcode manager 43. The MPD and the segment supplied from the DASH delivery server 22 to the CDN origin server 41a-2 arrive at the CDN edge server 41b-2 via the multistage CDN relay servers, not depicted.

In the CDN edge server 41b-2, the TranscodeDirective-added MPD and an untranscoded segment are input to the transcoder 42. Furthermore, in the CDN edge server 41b-2, the MPD changed to refer to the transcoded segment and the transcoded segment are output from the transcoder 42. Moreover, the CDN edge server 41b-2 transmits the MPD changed to refer to the transcoded segment and the transcoded segment to the DASH player 14-3. Therefore, the DASH player 14-3 acquires the content delivered in this way and reproduces the content.

Figure 13:
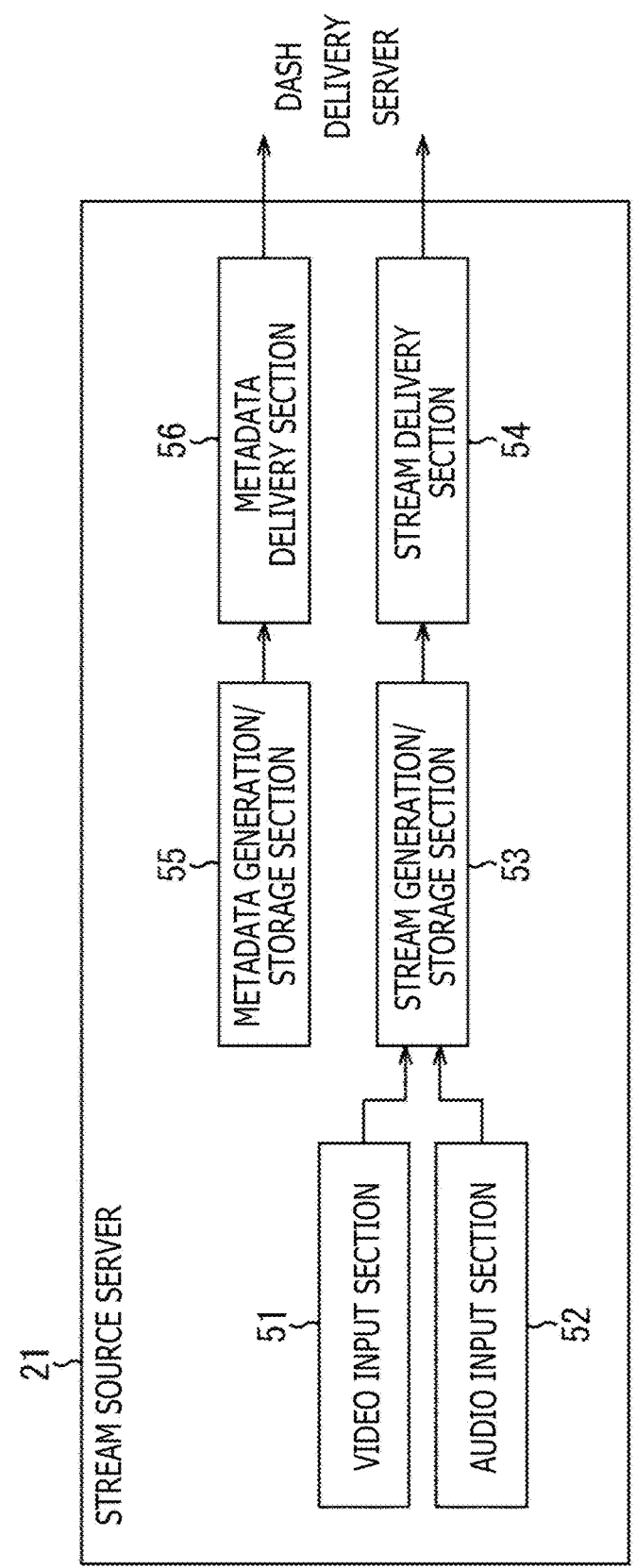
FIG. 13 is a block diagram depicting an example of a configuration of a stream source server.

FIG. 13 is a block diagram depicting an example of a configuration of the stream source server 21.

As depicted in FIG. 13, the stream source server 21 is configured with a video input section 51, an audio input section 52, a stream generation/storage section 53, a stream delivery section 54, a metadata generation/storage section 55, and a metadata delivery section 56.

Video data captured by, for example, an imaging apparatus that is not depicted is input to the video input section 51, and audio data collected by, for example, a sound pickup apparatus that is not depicted is input to the audio input section 52.

The stream generation/storage section 53 generates a stream on the basis of the video data supplied from the video input section 51 and the audio data supplied from the audio input section 52, and stores the stream.

The stream delivery section 54 reads the stream from the stream generation/storage section 53 and delivers the stream to the DASH delivery server 22.

The metadata generation/storage section 55 generates metadata regarding the stream stored in the stream generation/storage section 53 and stores the metadata.

The metadata delivery section 56 reads the metadata from the metadata generation/storage section 55 and delivers the metadata to the DASH delivery server 22.

Figure 14:
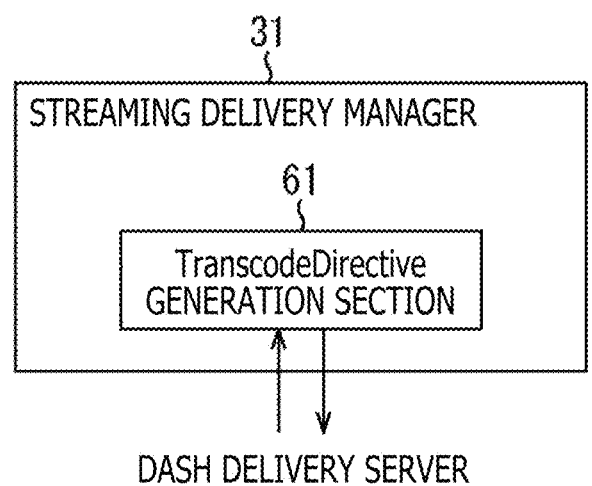
FIG. 14 is a block diagram depicting an example of a configuration of a streaming delivery manager.

FIG. 14 is a block diagram depicting an example of a configuration of the streaming delivery manager 31.

As depicted in FIG. 14, the streaming delivery manager 31 is configured with a TranscodeDirective generation section 61.

The TranscodeDirective generation section 61 generates TranscodeDirective (definition information) describing control, conditions, and the like at the time of performing transcoding by the transcoder 42, for example. In addition, the TranscodeDirective generation section 61 adds the generated TranscodeDirective to the original MPD supplied from the DASH delivery server 22 and supplies the TranscodeDirective-added MPD to the DASH delivery server 22.

Figure 15:
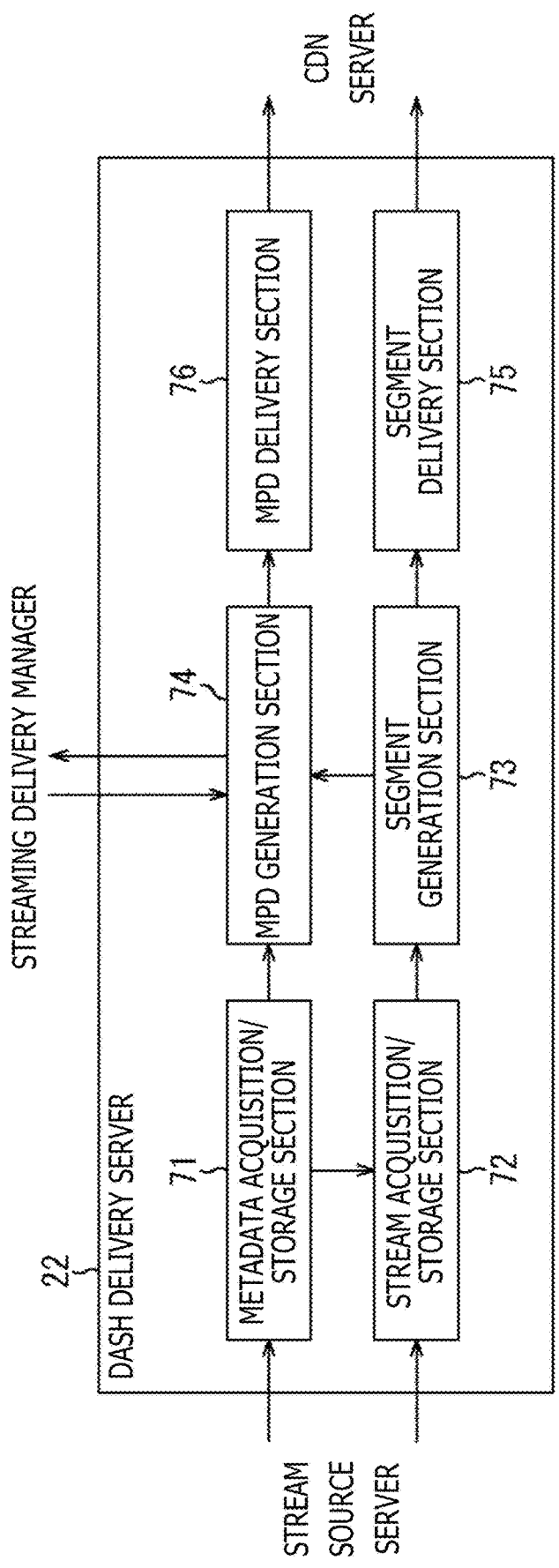
FIG. 15 is a block diagram depicting an example of a configuration of a DASH delivery server.

FIG. 15 is a block diagram depicting an example of a configuration of the DASH delivery server 22.

As depicted in FIG. 15, the DASH delivery server 22 is configured with a metadata acquisition/storage section 71, a stream acquisition/storage section 72, a segment generation section 73, an MPD generation section 74, a segment delivery section 75, and an MPD delivery section 76.

The metadata acquisition/storage section 71 acquires the metadata supplied from the metadata delivery section 56 of the stream source server 21 and stores the metadata. In addition, the metadata acquisition/storage section 71 supplies the metadata to the stream acquisition/storage section 72 and the MPD generation section 74.

The stream acquisition/storage section 72 acquires the stream supplied from the stream delivery section 54 of the stream source server 21 and stores the stream. In addition, the stream acquisition/storage section 72 encodes the stream on the basis of the metadata supplied from the metadata acquisition/storage section 71 and supplies a content delivered by the stream to the segment generation section 73.

The segment generation section 73 generates a segment compliant with MPEG-DASH from the content supplied from the stream acquisition/storage section 72, supplies the segment to the segment delivery section 75, and requests the MPD generation section 74 to generate an MPD of the segment.

The MPD generation section 74 generates an original MPD for the segment generated by the segment generation section 73 on the basis of the metadata supplied from the metadata acquisition/storage section 71 (stores a URL of media data) and supplies the MPD to the streaming delivery manager 31. In addition, the MPD generation section 74 receives the MPD to which the TranscodeDirective is added by the streaming delivery manager 31 and supplies the TranscodeDirective-added MPD to the MPD delivery section 76.

The segment delivery section 75 delivers the segment supplied from the segment generation section 73 to the CDN 23.

The MPD delivery section 76 delivers the MPD supplied from the MPD generation section 74 to the CDN 23.

Figure 16:
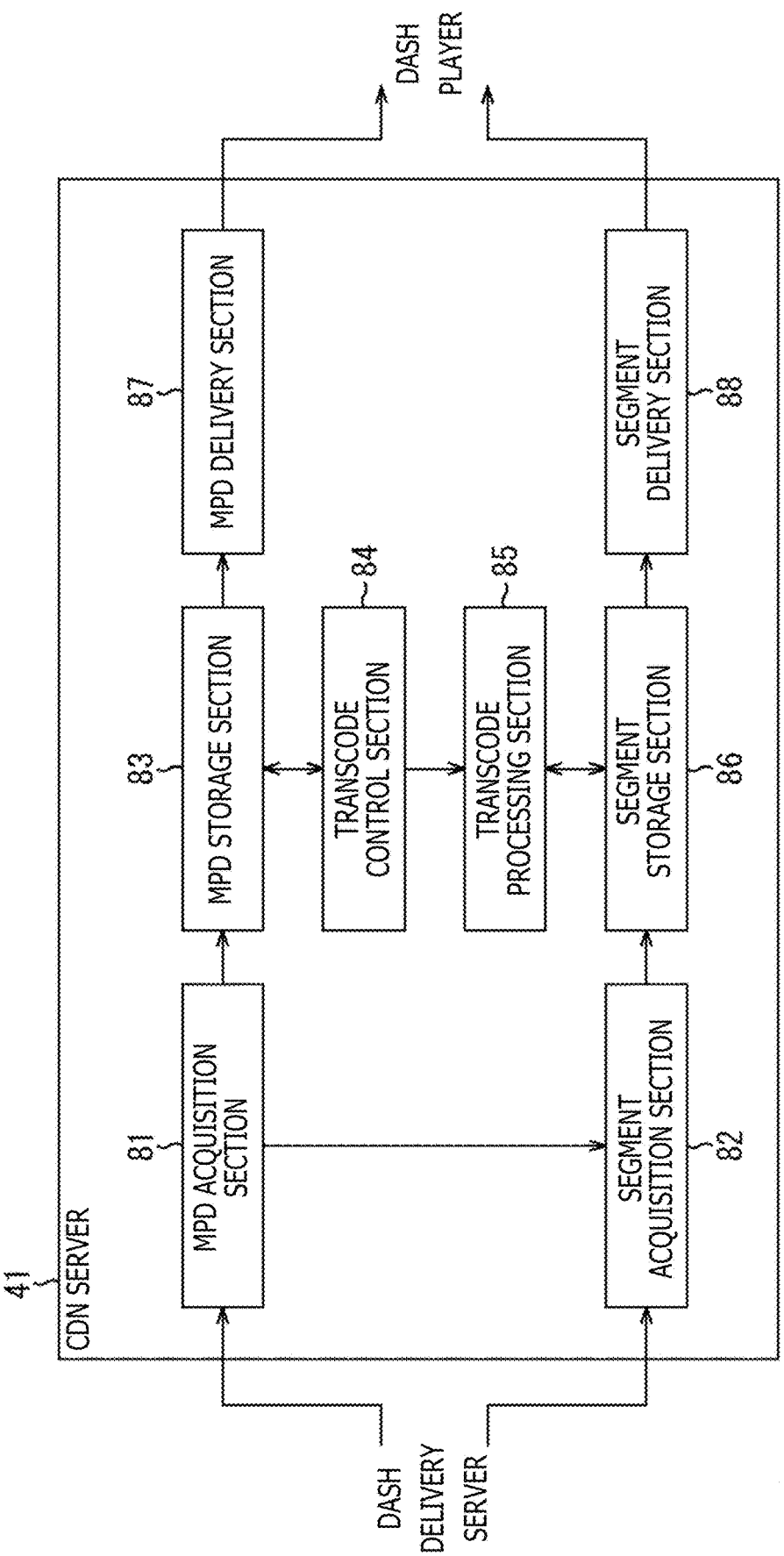
FIG. 16 is a block diagram depicting an example of a configuration of a CDN server.

FIG. 16 is a block diagram depicting an example of a configuration of the CDN server 41 configuring the CDN 23. It is noted that the CDN origin server 41a of FIG. 12, the CDN relay servers that are not depicted, and the CDN edge server 41b are similar in configuration to the CDN server 41.

As depicted in FIG. 16, the CDN server 41 is configured with an MPD acquisition section 81, a segment acquisition section 82, an MPD storage section 83, a transcode control section 84, a transcode processing section 85, a segment storage section 86, an MPD delivery section 87, and a segment delivery section 88.

The MPD acquisition section 81 acquires the TranscodeDirective-added MPD delivered from the MPD delivery section 76 of the DASH delivery server 22 and supplies the TranscodeDirective-added MPD to the segment acquisition section 82 and the MPD storage section 83.

The segment acquisition section 82 acquires the segment delivered from the segment delivery section 75 of the DASH delivery server 22 and supplies the segment to the segment storage section 86.

The MPD storage section 83 stores the TranscodeDirective-added MPD acquired by the MPD acquisition section 81 and the TranscodeDirective-added MPD updated by the transcode control section 84.

The transcode control section 84 reads the TranscodeDirective-added MPD from the MPD storage section 83, analyzes the TranscodeDirective-added MPD, and analyzes the TranscodeDirective. The transcode control section 84 then updates the MPD in accordance with an analysis result, returns the MPD to the TranscodeDirective-added MPD, and controls transcoding of the segment in the transcode processing section 85 on the basis of the updated MPD. In a case, for example, in which a TranscodeDirective element is stored in the MPD (refer to FIG. 24 to be described later), the transcode control section 84 controls transcoding on the basis of the TranscodeDirective element. Alternatively, in a case in which a URL of a TranscodeDirective file is stored in the MPD (refer to FIG. 25 to be described later), the transcode control section 84 controls transcoding on the basis of the TranscodeDirective element received in response to a request of the TranscodeDirective on the basis of the URL of the TranscodeDirective file.

The transcode processing section 85 reads the segment from the segment storage section 86, transcodes the segment under control of the transcode control section 84, and returns the transcoded segment to the segment storage section 86.

The segment storage section 86 stores the segment acquired by the segment acquisition section 82 and the transcoded segment by the transcode processing section 85.

The MPD delivery section 87 reads the TranscodeDirective-added MPD updated by the transcode control section 84 from the MPD storage section 83 and delivers the updated TranscodeDirective-added MPD to the DASH player 14.

The segment delivery section 88 reads the transcoded segment from the segment storage section 86 and delivers the transcoded segment to the DASH player 14.

Figure 17:
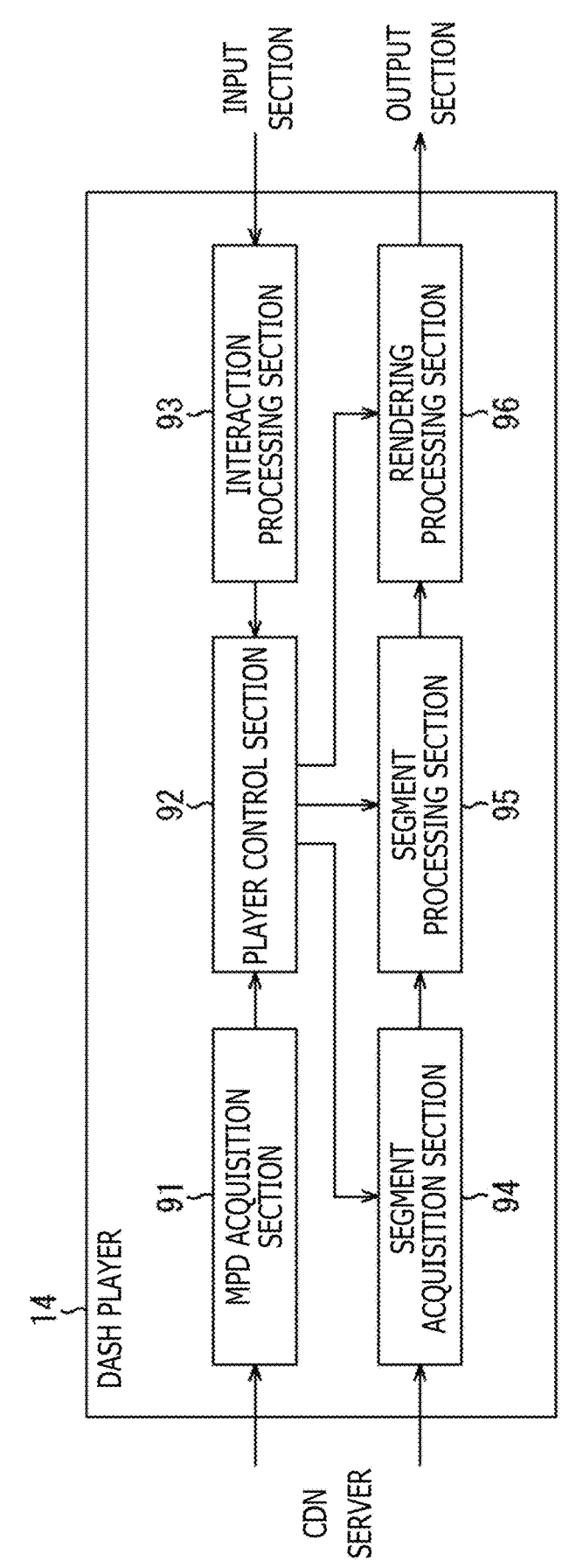
FIG. 17 is a block diagram depicting an example of a configuration of a DASH player.

FIG. 17 is a block diagram depicting an example of a configuration of the DASH player 14.

As depicted in FIG. 17, the DASH player 14 is configured with an MPD acquisition section 91, a player control section 92, an interaction processing section 93, a segment acquisition section 94, a segment processing section 95, and a rendering processing section 96.

The MPD acquisition section 91 acquires the MPD delivered from the MPD delivery section 87 of the CDN server 41 and supplies the MPD to the player control section 92.

The player control section 92 controls the segment acquisition section 94, the segment processing section 95, and the rendering processing section 96 in accordance with the MPD supplied from the MPD acquisition section 91 (TranscodeDirective-added MPD updated by the CDN server 41). At this time, the player control section 92 controls reproducing of the content in response to a user's interaction acquired by the interaction processing section 93 (for example, direction of a user's face in a case in which the DASH player 14 is a head mounted display).

The interaction processing section 93 performs processing on various kinds of information (for example, information indicating the direction in the case in which the DASH player 14 is a head mounted display) input to an input section that is not depicted, acquires the user's interaction with respect to the DASH player 14, and supplies the user's interaction to the player control section 92.

The segment acquisition section 94 acquires the segment delivered from the segment delivery section 88 of the CDN server 41 and supplies the segment necessary for the DASH player 14 to reproduce the content to the segment processing section 95 under control of the player control section 92.

The segment processing section 95 performs processing on the segment supplied from the segment acquisition section 94, reproduces the content, and supplies the content to the rendering processing section 96 under control of the player control section 92.

The rendering processing section 96 performs rendering on the content supplied from the segment processing section 95 and outputs the resultant content to an output section that is not depicted to display the content under control of the player control section 92.

Content delivery processing in the content delivery system 11 configured with the stream source server 21, the streaming delivery manager 31, the DASH delivery server 22, the CDN server 41, and the DASH player 14 described above will now be described in detail.

In the case, for example, of delivering a broadcast stream by the content delivery system 11, programs, commercials, and the like are accumulated in the stream source server 21. Furthermore, as depicted in FIG. 12, the stream delivered from the stream source server 21 arrives at the CDN edge server 41b via the multistage CDN relay servers from the CDN origin server 41a among a plurality of CDN servers 41 configuring each of the CDNs 23 provided by delivery service providers by way of the DASH delivery server 22 and is finally reproduced by each DASH player 14.

At this time, in the DASH delivery server 22, the MPD generation section 74 (FIG. 15) temporarily passes the generated original MPD to the streaming delivery manager 31. In the streaming delivery manager 31, the TranscodeDirective generation section 61 (FIG. 14) then modifies the MPD as appropriate on the basis of a delivery policy of the stream and returns the modified MPD to the MPD generation section 74.

At this time, the TranscodeDirective generation section 61 modifies the MPD by adding TranscodeDirective elements describing, for example, control, conditions, and the like for the stream related to transcoding in the CDN 23 to AdaptationSet elements. A format for simply representing candidates and the like of a transformed profile permitted by a servicer or an author side is used therein. Furthermore, when contents to be constrained in decoding, rendering, or re-encoding processing performed by the CDN server 41 of FIG. 16 are present, the format needs to accurately represent those contents.

In other words, it is desired that the following declaration can be performed at the time of temporarily returning an encoded original stream to a baseband stream and re-encoding the baseband stream in the course of transcoding processing in the CDN server 41.

First, cases of making various image corrections for upscaling are increasing, and it is desired to be capable of declaring whether or not such processing can be performed. Furthermore, secondly, it is desired to be capable of declaring whether or not to permit not only simple integer multiple transform of spatial resolution or temporal resolution but also various upscaling processing patterns (refer to FIGS. 35 to 38 to be described later) as upscaling processing methods.

Moreover, thirdly, cases of performing viewport dependent scaling and encoding are considered to increase, and it is desired to be capable of declaring whether or not such partial transcoding processing can be performed. Furthermore, fourthly, it is desired to be capable of declaring a condition description in control as to whether or not to perform transcoding processing such as maximum delay time as an upper limit at the time of performing transcoding and an upper limit of a quality difference (for example, dissociation from original baseband data).

Furthermore, fifthly, it is necessary to provide a function to deliver a feedback report of such processing, if performed, to the author side, and it is desired to be capable of declaring contents such as a structure and a URL of a Notification message at that time. It is supposed, for example, herein to deliver a feedback report as to at what stage of the CDN edge servers 41b and the like near users what processing is performed within the CDN 23 or across a plurality of CDNs 23.

The MPD modified by adding the TranscodeDirective element describing such contents and the DASH segment are passed to the CDNs 23-1 and 23-2 of FIG. 12 and transferred to the CDN edge servers 41b via the multistage CDN servers 41. Upon acquiring the desired MPD, each DASH player 14 then fetches the segment on the CDN edge server 41b using HTTP. It is noted that a segmenter sometimes delivers a segment in a protocol and format other than HTTP and the DASH segment to the CDN edge server 41b within the CDN 23. Furthermore, the CDN edge server 41b sometimes acquires (PULL acquisition) a desired segment by HTTP from, for example, the upper-stage CDN server 41.

In a case herein in which each DASH player 14 acquires the MPD by way of the CDN edge server 41b, a segment encoding scheme is sometimes changed on the basis of a network state between the CDN edge server 41b and the DASH player 14, a viewing liking of an end user of the individual DASH player 14, and the like. Such transcoding is executed on the CDN edge server 41b within each CDN 23 while a load is distributed in response to a loaded state as appropriate.

For example, in ordinary VoD (Video On Demand) streaming, before the CDN origin server 41a starts delivery, streams at a plurality of bit rates of a certain content may be generated and a stream may be delivered in response to a user's request. Alternatively, to improve response performance, before a request from a client, streams may be delivered in advance (prefetched or push delivered) to the CDN edge server 41b (or the CDN relay servers that serve as intermediate nodes on a delivery path).

In a case herein in which the CDN edge server 41b (hereinafter, expression "CDN edge server 41b" including the CDN relay servers as the intermediate nodes on the delivery path will be used) is capable of grasping (supposing) a tendency of the client's request in advance, the CDN edge server 41b is capable of improving qualities of streaming (including image and audio qualities and response performance) in advance in consideration of a client's reproducing or viewing liking on the basis of the original stream. For example, the CDN edge server 41b improves the qualities of streaming on the basis of a reproducing capability of the DASH player 14, a codec type, and the like predicted from past statistics of requests from a client group accessing the CDN edge server 41b.

Furthermore, in a case in which the author provides ROI (Region Of Interest) metadata and the like and a region on an image likely to be requested in advance by a client (while it is also supposed that a plurality of ROIs is present on the same image) can be identified, the CDN edge server 41b sometimes performs upscaling with a focus on those ROI regions and then re-encodes the stream. In such a case, a plurality of versions of a transcoded segment is prepared on the assumption that requests from clients scatter for, for example, first few segments (ROI regions differ among the clients). Furthermore, after the requests from the clients are settled into a stationary state, a cache area of the CDN edge server 41b can be greatly saved by transcoding subsequent segments (subsets out of a first variation, that is, mainly subsets out of the plurality of ROIs on the same image).

To control such flexible transcoding, the transcode manager 43 is mounted in the CDN edge server 41b. The transcode manager 43 instructs the transcoder 42 mounted in the CDN edge server 41b to perform transcoding of segments using the MPD passed to the DASH player 14 and knowledge regarding the request based on the MPD while grasping a network load status between the CDN 23 and the DASH player 14 and considering a load status of the CDN edge server 41b.

Furthermore, the transcode manager 43 parses contents of the TranscodeDirective described in the MPD and instructs the transcoder 42 to transcode the segment concerned on the basis of various constraints or conditions associated with transcoding processing described in the TranscodeDirective. When the transcoder 42 performs the transcoding processing, the transcode manager 43 then transmits a report message to a report back URL described in the Transcode-Directive.

Furthermore, the transcode manager 43 updates the contents of the MPD and changes the MPD referring to the original segment to an MPD referring to a transcoded segment. In a case herein in which the update does not involve an update of the contents of the MPD such as partial change in segment in consideration of a viewport to be described later, that is, in a case in which an upscaling-caused parameter modification is closed to a file format level (for example, does not influence the MPD), the transcode manager 43 sometimes changes only contents of the segment with the MPD left to refer to the original segment. In this case, there is no need to urge each client to acquire the updated MPD.

The DASH player 14 acquires the MPD changed to refer to the transcoded segment in this way and acquires and reproduces the segment on the basis of the MPD.

Figure 18:
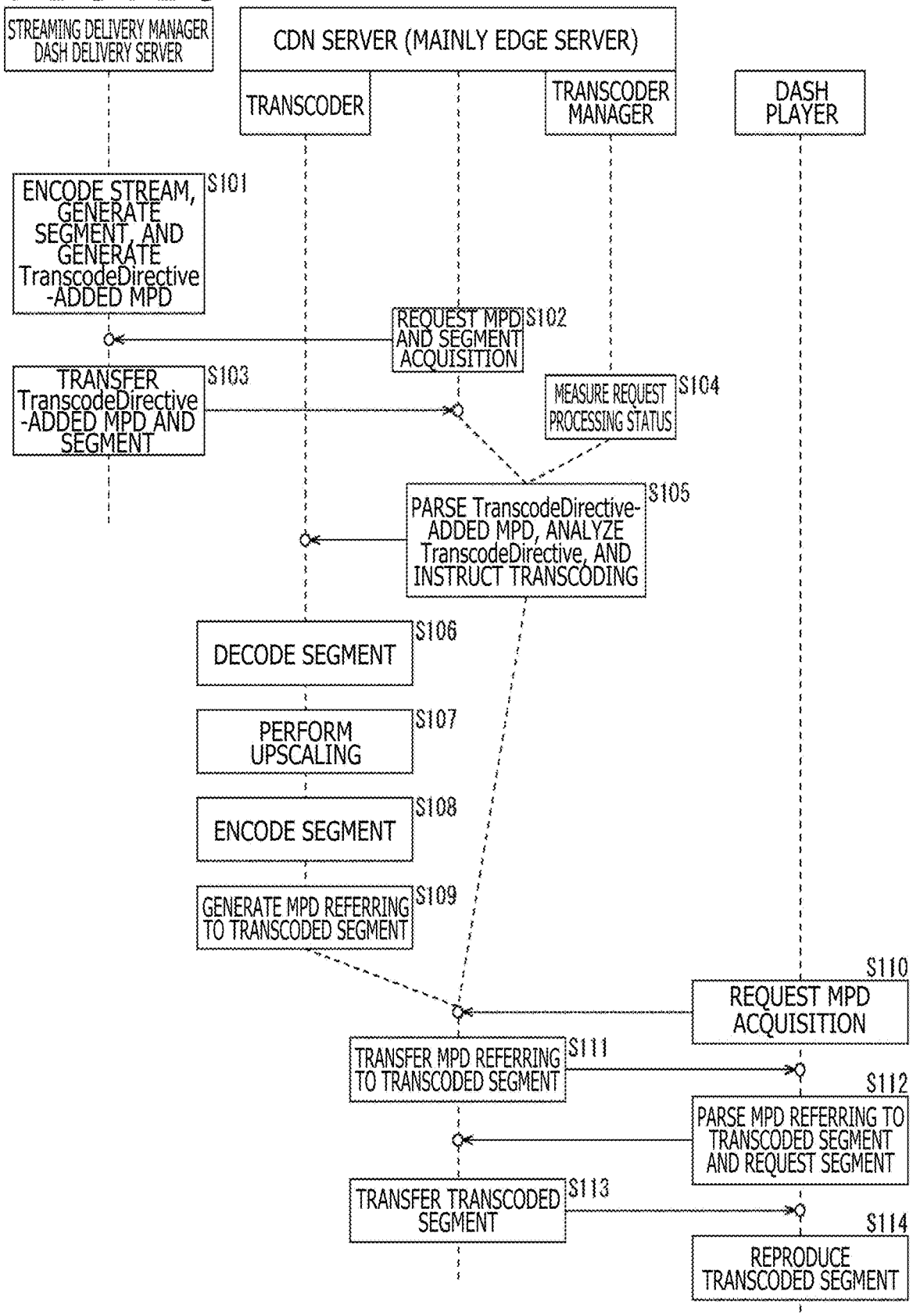
FIG. 18 is an explanatory diagram of content delivery processing in the content delivery system of FIG. 12.

With reference to FIG. 18, processing performed by the DASH delivery server 22, the streaming delivery manager 31, the CDN server 41 (mainly the transcoder 42 and the transcode manager 43 on the CDN edge server 41b), and the DASH player 14 in content delivery processing performed in the content delivery system 11 of FIG. 12 will be described.

In Step S101, in the DASH delivery server 22, the stream acquisition/storage section 72 receives and encodes a stream delivered from the stream source server 21, and the segment generation section 73 generates a segment. The streaming delivery manager 31 then generates a TranscodeDirective-added MPD. At this time, in a case, for example, in which the contents of the TranscodeDirective are provided as metadata from upstream via the FLUS interface, the streaming delivery manager 31 inserts the contents of the TranscodeDirective depicted in FIG. 9 described above into the MPD. Alternatively, the streaming delivery manager 31 may insert a URL of a TranscodeDirective file into the MPD as described above as an alternative to the TranscodeDirective.

In Step S102, the CDN server 41 requests MPD acquisition and segment acquisition to the DASH delivery server 22.

Upon acquiring a request from the CDN server 41 in Step S102, the DASH delivery server 22 starts transferring the TranscodeDirective-added MPD and the segment in Step S103.

In Step S104, the transcode manager 43 measures a request processing status.

When the CDN server 41 receives the TranscodeDirective-added MPD and the segment transferred from the DASH delivery server 22 in Step S103, the transcode manager 43 parses the TranscodeDirective-added MPD in Step S105. The transcode manager 43 then analyzes the TranscodeDirective and instructs the transcoder 42 to perform transcoding in accordance with an analysis result.

The transcoder 42 decodes the segment in Step S106, performs upscaling in Step S107, and encodes the segment in Step S108 in accordance with the transcoding instruction by the transcode manager 43. In Step S109, the transcoder 42 then generates an MPD referring to the transcoded segment.

In Step S110, the DASH player 14 requests MPD acquisition to the CDN server 41.

Upon receiving a request from the DASH player 14 in Step S110, the CDN server 41 transfers the MPD referring to the transcoded segment to the DASH player 14 in Step S111.

Upon acquiring the MPD referring to the transcoded segment and transferred in Step S111, the DASH player 14 parses the MPD in Step S112. The DASH player 14 then requests the CDN server 41 for the segment.

Upon acquiring a request from the DASH player 14 in Step S112, the CDN server 41 transfers the transcoded segment requested by the DASH player 14 in Step S113.

Upon receiving the transcoded segment transferred in Step S113, the DASH player 14 reproduces the received transcoded segment in Step S114.

Subsequently, until end of content delivery, transcoded segments are continuously transferred and reproduced.

As described so far, the streaming delivery manager 31 generates the TranscodeDirective-added MPD, so that the transcode manager 43 can parse the MPD, analyze the TranscodeDirective, and instruct transcoding.

Figure 21:
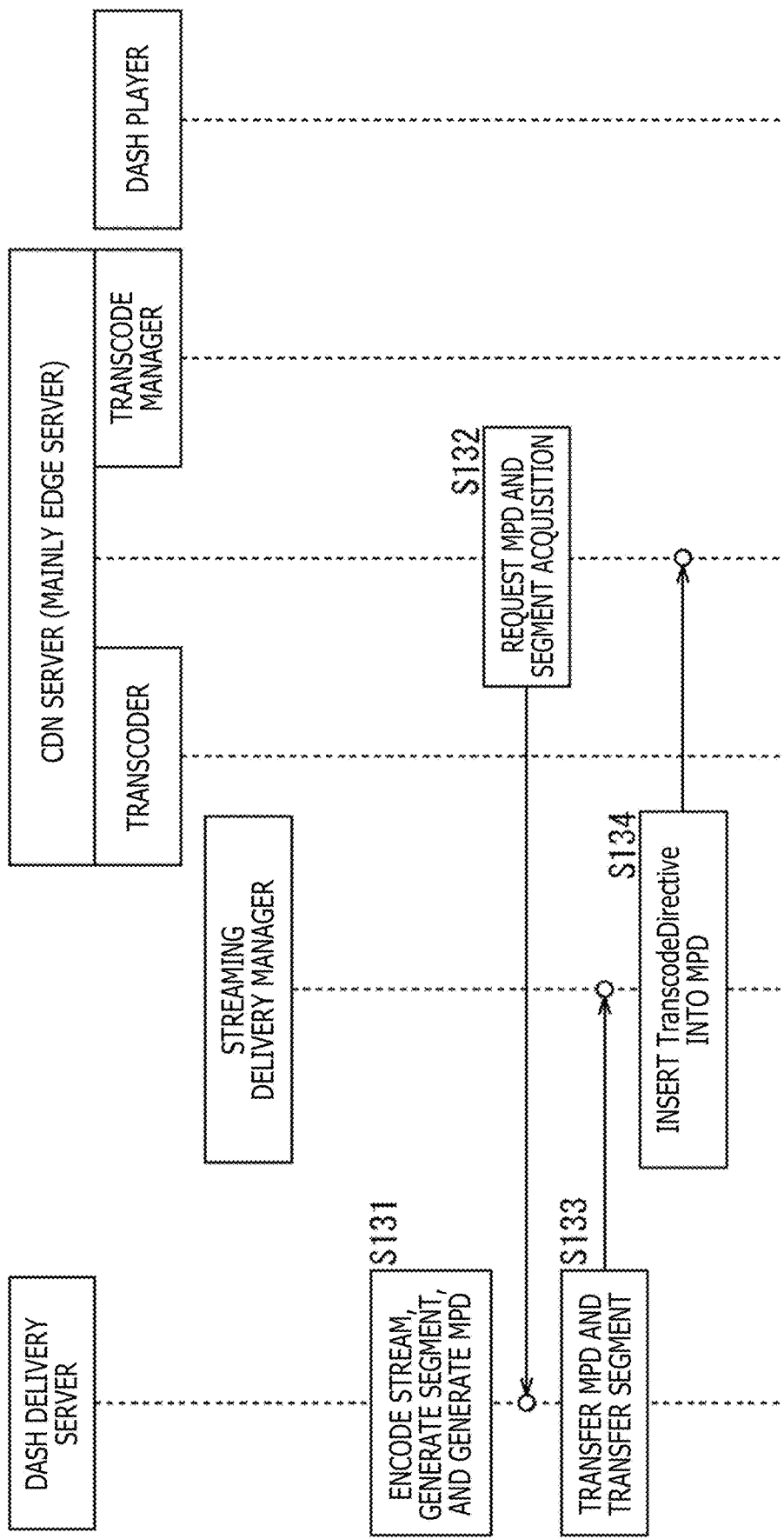
FIG. 21 is an explanatory diagram of content delivery processing in the content delivery system of FIG. 20.
Figure 22:
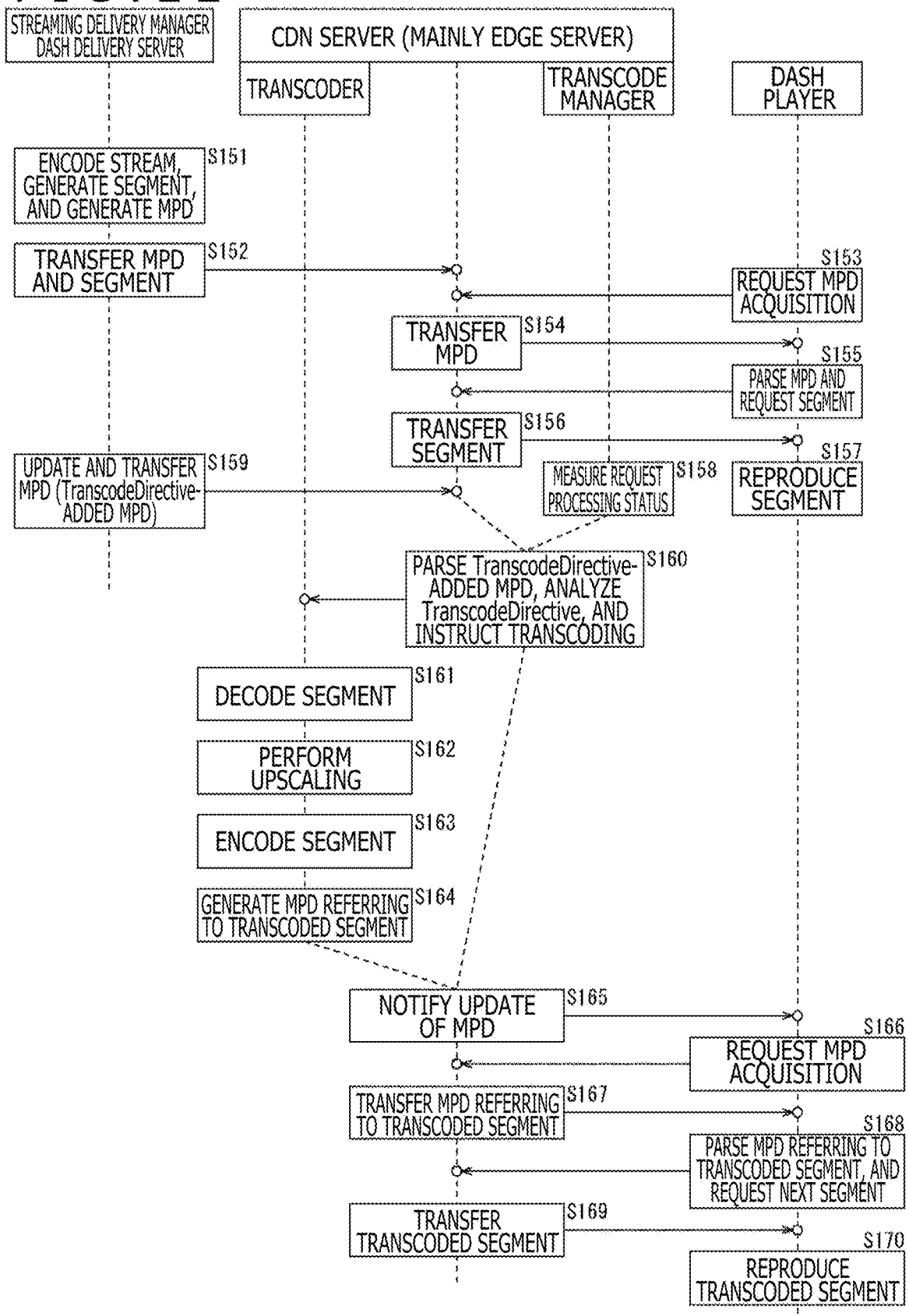
FIG. 22 is an explanatory diagram of content delivery processing for notifying a client of an MPD referring to a transcoded segment and causing the client to acquire the segment.
Figure 23:
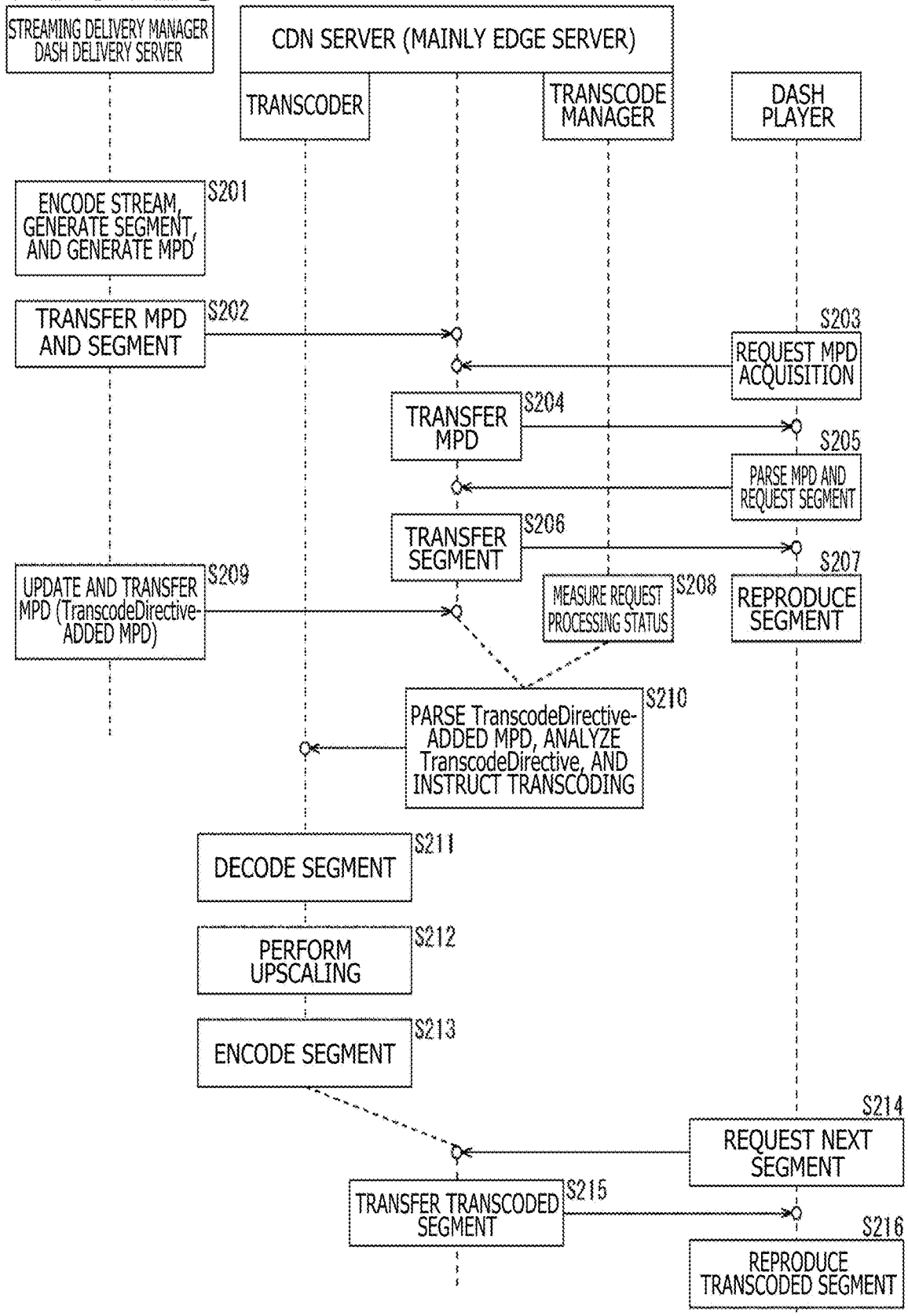
FIG. 23 is an explanatory diagram of content delivery processing for applying a URL of an untranscoded segment to a URL of a transcoded segment and causing a client to acquire the segment.

While an example in which the CDN server 41 requests the DASH delivery server 22 to acquire the MPD and the segment is described herein, the DASH delivery server 22 may transfer the MPD and the segment to the CDN server 41 in a Push fashion. Alternatively, a flow may be started from bottom up in such a manner that the DASH player 14 requests the MPD first and the CDN server 41 transfers the MPD and the segment in accordance with the request. FIGS. 21 to 23 to be described later depict examples of processing in the case, inclusive of such a pattern, of a dynamic update of the MPD, which possibly occurs at the time of live streaming.

Figure 19:
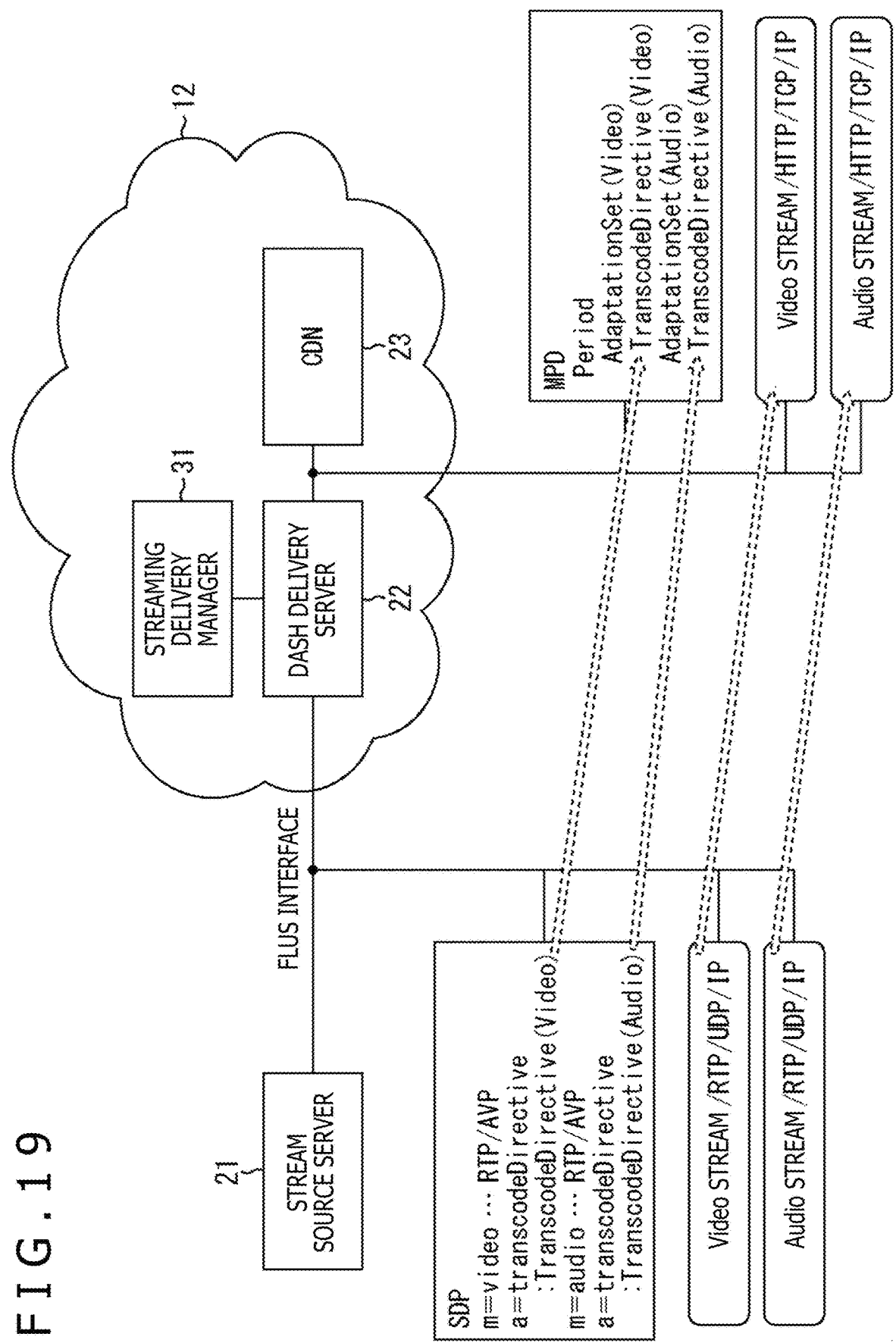
FIG. 19 is a diagram depicting a correspondence relation in a case in which contents of TranscodeDirective are passed as metadata (SDP) via the FLUS interface.

FIG. 19 depicts herein a correspondence relation in a case in which the contents of the TranscodeDirective are passed as the metadata (SDP) via the FLUS interface in Step S101 of FIG. 18. In other words, the correspondence relation depicted in FIG. 19 is held between TranscodeDirective described in the SDP and TranscodeDirective inserted into the MPD. Likewise, the correspondence relation depicted in FIG. 19 is held between a stream from the stream source server 21 and a stream on the cloud 12 in a subsequent stage of the DASH delivery server 22.

Figure 20:
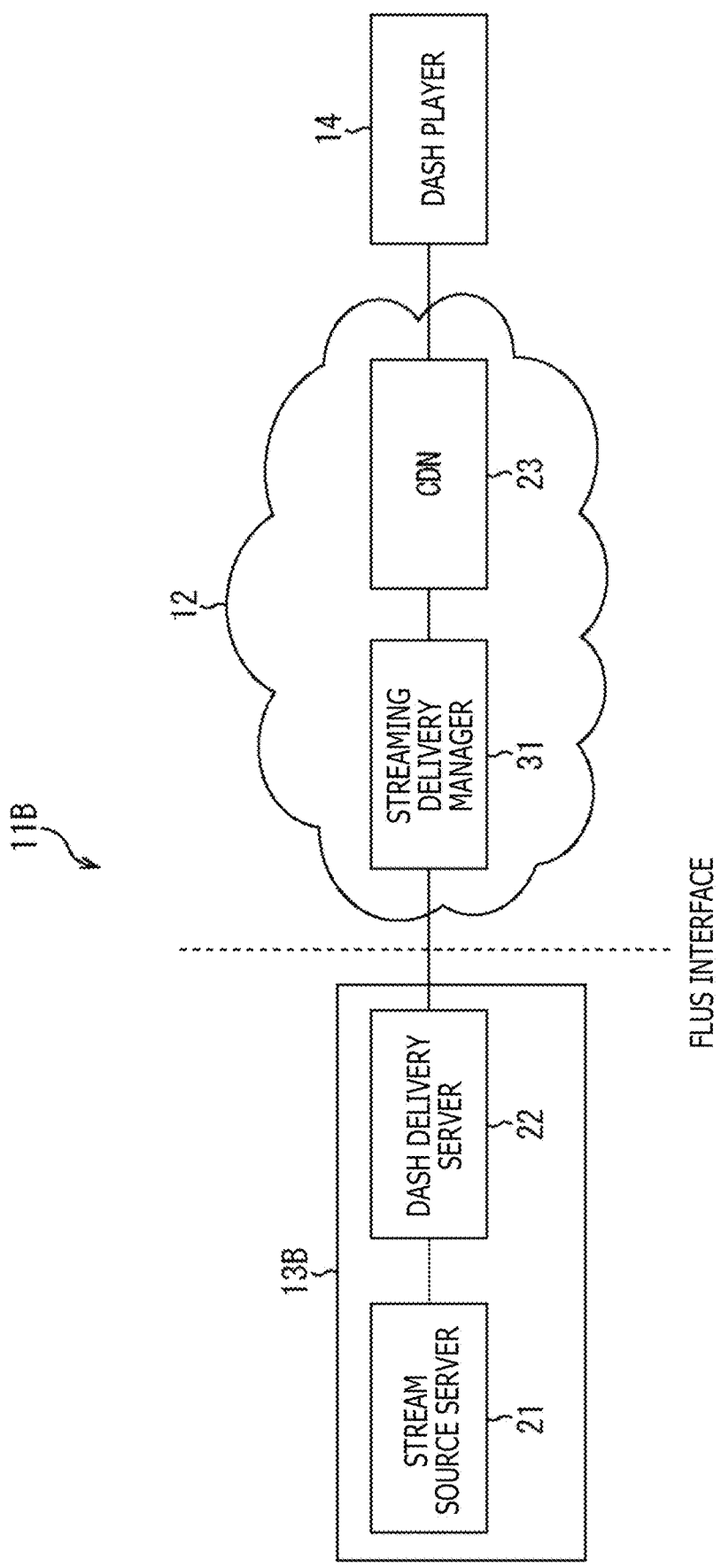
FIG. 20 is a block diagram depicting an example of a configuration of a variation of the content delivery system in which a streaming delivery manager is provided on a cloud.

FIG. 20 is a block diagram depicting an example of a configuration of the content delivery system 11B as a variation in which the streaming delivery manager 31 is provided on the cloud 12.

As depicted in FIG. 20, the content delivery system 11B is configured in such a manner that the streaming delivery manager 31 adding the contents of the TranscodeDirective to the MPD is disposed between the DASH delivery server 22 of the content providing apparatus 13 and the CDN 23 on the cloud 12. In the content delivery system 11B, therefore, the FLUS interface is used between the content providing apparatus 13B and the streaming delivery manager 31 and CDN 23. The content delivery system 11B configured in this way has a pattern in which the TranscodeDirective is not described in the MPD and a pattern in which the TranscodeDirective is already described therein.

Content delivery processing in the content delivery system 11B configured as depicted in FIG. 20 will be described with reference to FIG. 21.

In Step S131, similarly to Step S101 of FIG. 18, the DASH delivery server 22 encodes a stream supplied from the stream source server 21 and generates a segment.

In Step S132, the CDN server 41 requests the DASH delivery server 22 to acquire the MPD and the segment.

Upon acquiring a request from the CDN server 41 in Step S132, the DASH delivery server 22 starts transferring the MPD and the segment to the streaming delivery manager 31.

Upon receiving the MPD and the segment transferred in Step S133, the streaming delivery manager 31 inserts the TranscodeDirective into the MPD in Step S134. The streaming delivery manager 31 then starts transferring a TranscodeDirective-added MPD and the segment to the CDN server 41.

Subsequently, the content is delivered by similar processing to that in Step S105 and the subsequent steps of FIG. 18.

In this way, with the configuration of providing the streaming delivery manager 31 on the cloud 12, the DASH delivery server 22 delivers the TranscodeDirective-added MPD and the segment to the CDN server 41 via the streaming delivery manager 31.

Content delivery processing for notifying a client of the MPD referring to the transcoded segment and causing the client to acquire the segment in the content delivery system 11 of FIG. 12 will be described with reference to FIG. 22.

In Step S151, similarly to Step S101 of FIG. 18, the DASH delivery server 22 encodes a stream supplied from the stream source server 21 and generates a segment. Furthermore, the MPD generation section 74 in the DASH delivery server 22 generates an original MPD.

In Step S152, the DASH delivery server 22 transfers the MPD and the segment generated in Step S151, and the CDN server 41 acquires the MPD and the segment.

In Step S153, the DASH player 14 requests MPD acquisition to the CDN server 41.

Upon receiving a request from the DASH player 14 in Step S153, the CDN server 41 transfers the MPD acquired in Step S152 to the DASH player 14 in Step S154.

Upon acquiring the MPD transferred in Step S154, the DASH player 14 parses the MPD in Step S155. The DASH player 14 then requests the segment to the CDN server 41.

Upon acquiring a request from the DASH player 14 in Step S155, the CDN server 41 transfers the segment requested by the DASH player 14 in Step S156.

Upon receiving the segment transferred in Step S156, the DASH player 14 reproduces the received segment in Step S157.

In Step S158, the transcode manager 43 measures a request processing status.

In Step S159, the DASH delivery server 22 updates and transfers the MPD, that is, transfers a TranscodeDirective-added MPD by the streaming delivery manager 31 to the CDN server 41.

When the CDN server 41 receives the TranscodeDirective-added MPD and the segment transferred from the DASH delivery server 22 in Step S159, the transcode manager 43 parses the TranscodeDirective-added MPD in Step S160. The transcode manager 43 then analyzes the TranscodeDirective and instructs the transcoder 42 to perform transcoding in accordance with an analysis result.

The transcoder 42 decodes the segment in Step S161, performs upscaling in Step S162, and encodes the segment in Step S163 in accordance with the transcoding instruction by the transcode manager 43. Furthermore, in Step S164, the transcoder 42 generates an MPD referring to the transcoded segment.

In Step S165, the CDN server 41 notifies the DASH player 14 of an update of the MPD.

In Step S166, the DASH player 14 requests MPD acquisition to the CDN server 41 in response to a notification from the CDN server 41 in Step S165.

Upon receiving a request from the DASH player 14 in Step S166, the CDN server 41 transfers the MPD referring to the transcoded segment to the DASH player 14 in Step S167.

Upon acquiring the MPD referring to the transcoded segment and transferred in Step S167, the DASH player 14 parses the MPD in Step S168. The DASH player 14 then requests the transcoded segment to the CDN server 41 as a next segment.

Upon acquiring a request from the DASH player 14 in Step S168, the CDN server 41 transfers the transcoded segment requested by the DASH player 14 in Step S169.

Upon receiving the transcoded segment transferred in Step S169, the DASH player 14 reproduces the received transcoded segment in Step S170.

Subsequently, until end of content delivery, transcoded segments are continuously transferred and reproduced.

As described so far, the CDN server 41 can notify the DASH player 14 of the update of the MPD, and the DASH player 14 can acquire the MPD referring to the transcoded segment in response to the notification and reproduce the transcoded segment.

Content delivery processing for applying a URL of an untranscoded segment to a URL of a transcoded segment and causing a client to acquire the segment in the content delivery system 11 of FIG. 12 will be described with reference to FIG. 23.

In Steps S201 to S213, similar processing to that in Steps S151 to S163 of FIG. 22 is performed.

Furthermore, in Step S214, the DASH player 14 requests a next segment.

At this time, the URL of the untranscoded segment is applied to the URL of the transcoded segment, and the URL of the segment requested by the DASH player 14 in Step S214 is replaced by the URL of the transcoded segment.

Therefore, in Step S215, the CDN server 41 transfers the transcoded segment in response to a request from the DASH player 14.

Upon receiving the transcoded segment transferred in Step S215, the DASH player 14 reproduces the received transcoded segment in Step S216.

As described so far, applying the URL of the untranscoded segment to the URL of the transcoded segment enables the DASH player 14 to acquire the transcoded segment without, for example, transferring the MPD changed to refer to the transcoded segment to the DASH player 14.

<Structure of TranscodeDirective>

A structure of the TranscodeDirective that is the metadata used by the CDN server 41 (mainly the CDN edge server 41b) in analysis or for-and-against determination will be described with reference to FIGS. 24 to 33.

In the case, for example, of using the DASH-MPD as a manifest of a streaming service, this metadata is added to an AdaptationSet element (or Representation element or Sub-Representation element) to be transcoded. It is noted that the transcode manager 43 can select optimum elements or values when a plurality of elements or values can be described.

FIG. 24 depicts an example of disposing a TranscodeDirective element in the DASH-MPD. For example, the TranscodeDirective element is stored as an independent file, and the TranscodeDirective element can be disposed between <TranscodeDirective . . . > and </TranscodeDirective> in such a manner as to add the TranscodeDirective element to the AdaptationSet element.

Furthermore, FIG. 25 depicts an example of a variation of disposing the TranscodeDirective element in the DASH-MPD. As depicted in FIG. 25, a URL of a TranscodeDirective file can be disposed in such a manner as to add the TranscodeDirective file to the AdaptationSet element.

Details of the TranscodeDirective element will be described hereinafter.

As depicted in (a) of FIG. 26, a transcodable attribute designates true or false as to whether or not transcoding can be performed. For example, a case in which only the transcodable attribute is present in the TranscodeDirective element and the transcodable attribute designates true indicates that transcoding in an arbitrary pattern can be performed. Conversely, a case in which the transcodable attribute designates false indicates that transcoding processing is entirely prohibited.

Further, when the transcodable attribute indicates that transcoding can be performed, the following attributes can be present.

As depicted in (b) of FIG. 26, an upScalable attribute designates true or false as to whether or not upscaling can be performed at the time of transcoding. For example, a case in which only the upScalable attribute is present while the transcodable attribute designates true and in which the upScalable attribute designates true indicates that upscaling in an arbitrary pattern can be performed after re-encoding. Conversely, a case in which only the upScalable attribute is present and the upScalable attribute designates false indicates that upscaling is entirely prohibited before re-encoding.

As depicted in (c) of FIG. 26, a processingLimit attribute designates maximum delay time that is an upper limit value of time required for transcoding processing.

As depicted in (d) of FIG. 26, an Allowed element designates at least one of (or a plurality of) Parameters/Video or Parameters/Audio as a codec parameter that can be selected at the time of re-encoding. It is noted that designating, for example, "/Parameters/"other media type"" in the Allowed element enables extension to contain making the other media type selectable.

As depicted in (e) of FIG. 26, a Prohibited element designates at least one of (or a plurality of) Parameters/Video or Parameters/Audio as a codec parameter that is prohibited from being selected at the time of re-encoding. It is noted that designating, for example, "/Parameters/"other media type"" in the Prohibited element enables extension to contain making selection of the other media type impossible.

As depicted in (f) of FIG. 26, a Condition element designates a URI for identifying a format of a condition description (condition description language) in a schemeIdUri attribute. For example, in the case of describing the condition description in ODRL, the Condition element designates urn:ODRL. Furthermore, the condition description is stored in a CDATA section (starting with a character string "<![CDATA[" and ending with a character string "]]>") that is a content part of the Condition element.

For example, as depicted in FIG. 27, the condition description is stored in the CDATA section of the content part of the Condition element.

Furthermore, FIG. 28 depicts an example of the condition description in ODRL. In FIG. 28, an example in which "a.com" that indicates a service owner allows the transcoding concerned to "cdn.com" until 2017/12/31 is described.

As depicted in (a) of FIG. 29, a TranscodeEventNotification element designates an event notification to which various constraints, policies, and the like described in the TranscodeDirective concerned are applied.

As depicted in (b) of FIG. 29, a dateTime attribute designates a clock time of occurrence of an event.

As depicted in (c) of FIG. 29, an MPDUrl attribute designates the URL of the MPD concerned.

As depicted in (d) of FIG. 29, an AdaptationSetId attribute designates an Id of the AdaptationSet to be transcoded.

As depicted in (e) of FIG. 29, a notificationUrl attribute designates a URL of a notification destination.

In the case herein, for example, of applying transcoding to a stream (segment) to which the TranscodeDirective concerned is applied, the TranscodeDirective element including the dateTime attribute, the MPDUrl attribute, and the AdaptationSetId attribute described above is notified per se to the URL designated by the notificationUrl attribute by HTTP POST. Contents of actually applied transcoding processing are thereby reported. At this time, it is assumed that elements, attributes, or values are filled as appropriate in accordance with a pattern of the applied transcoding.

Specifically, in the case of upconverting an original video stream into a stream at a 4K resolution and a 120 frame rate and then re-encoding an upconversion result, the TranscodeDirective element such as depicted in FIG. 30 is notified to the URL designated by the notificationUrl attribute.

As depicted in (a) of FIG. 31, a Parameters/Video element designates various attributes of a Video.

As depicted in (b) of FIG. 31, a profile attribute designates a list of "profile names" demarcated by commas.

As depicted in (c) of FIG. 31, a resolution attribute designates a list of "vertical×horizontal" pixel counts demarcated by commas. It is noted that as another example of expression of the resolution attribute, the resolution attribute may designate an upper limit or a lower limit of a vertical pixel count and an upper limit or a lower limit of a horizontal pixel count.

As depicted in (d) of FIG. 31, a frameRate attribute designates a list of "frame rates (in fps)" demarcated by commas. It is noted that as another example of expression of the frameRate attribute, the frameRate attribute may designate an upper limit or a lower limit of frame rates.

As depicted in (e) of FIG. 31, a bitDepth attribute designates a list of "bit counts (depths)" demarcated by commas. It is noted that as another example of expression of the bitDepth attribute, the bitDepth attribute may designate an upper limit or a lower limit of bit counts.

As depicted in (f) of FIG. 31, a colorSpace attribute designates a list of "color space names" demarcated by commas.

As depicted in (g) of FIG. 31, a gamma attribute designates a list of "gamma values" demarcated by commas.

As depicted in (h) of FIG. 31, an upScalingPatternList attribute designates a list of "upscaling patterns" demarcated by commas.

As depicted in (a) of FIG. 32, a partialTransformability attribute designates true or false as to whether or not rendering and transcoding involving partial upscaling can be performed.

As depicted in (b) of FIG. 32, a deviationLimit element designates a difference format identifier and a value expressed by the scheme.

As depicted in (c) of FIG. 32, a Parameters/Audio element designates various attributes of Audio and lists Audio attributes that are to be designated as true or false.

As depicted in (d) of FIG. 32, a profileList attribute designates a list of "profile names" demarcated by commas.

As depicted in (e) of FIG. 32, a samplingRate attribute designates a list of "sampling rates (in Hz)" demarcated by commas. It is noted that as another example of expression of the samplingRate attribute, the samplingRate attribute may designate an upper limit or a lower limit of sampling rates.

As depicted in (f) of FIG. 32, a bitDepth attribute designates a list of "bit counts (depths)" demarcated by commas. It is noted that as another example of expression of the bitDepth attribute, the bitDepth attribute may designate an upper limit or a lower limit of bit counts.

As depicted in (g) of FIG. 32, a deviationLimit element designates a difference format identifier and a value expressed by the scheme. As depicted in, for example, FIG. 33, a URI identifying a deviation expression scheme is designated in a schemeIdUri attribute of the deviationLimit element (for example, for PSNR, the URI is designated like urn:PSNR), and a value of the URI (35 in the example of FIG. 33) is stored in a value attribute.

Figure 34:
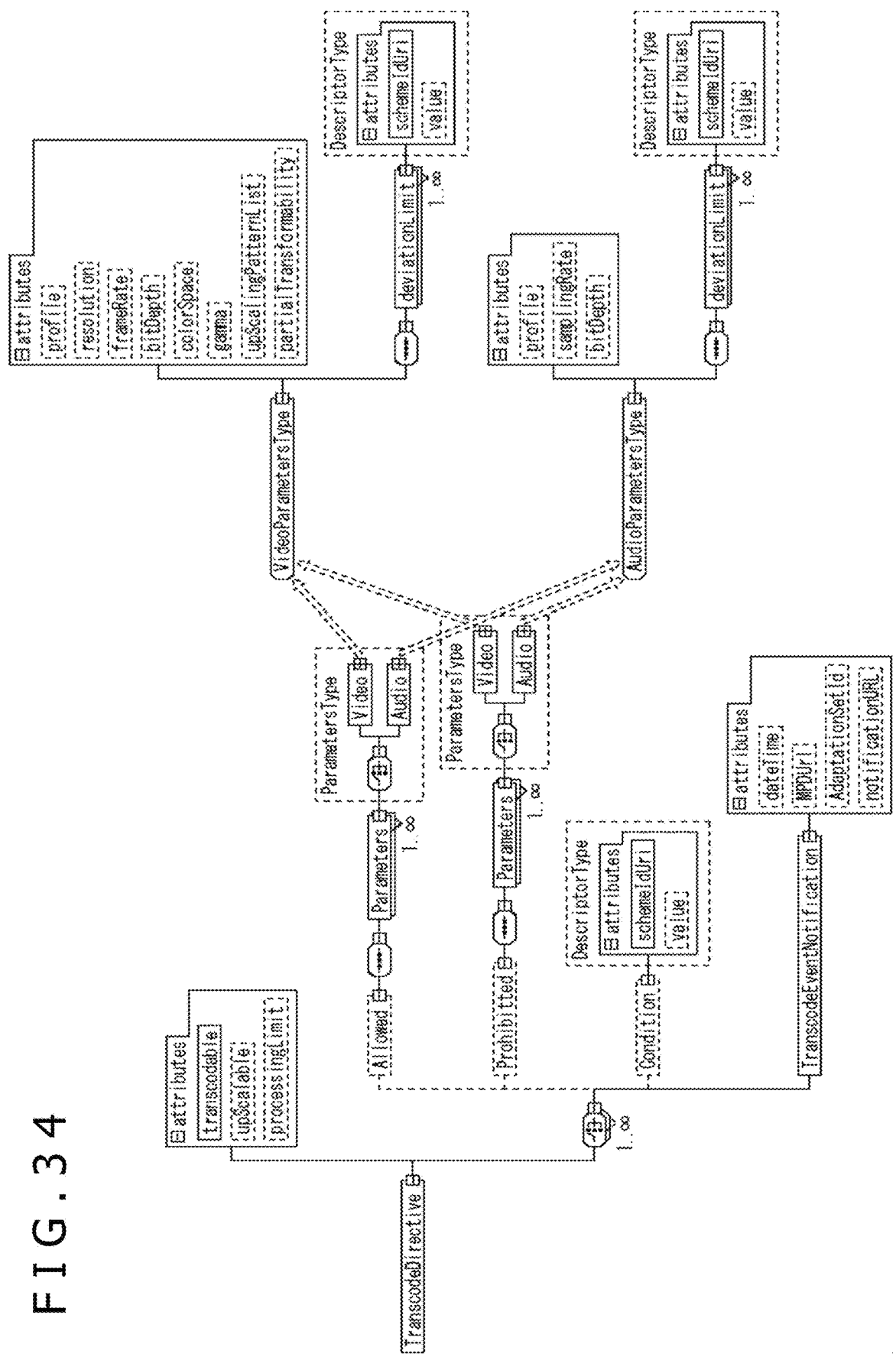
FIG. 34 is a diagram depicting an example of a configuration of TrasncodeDirective.

FIG. 34 depicts an example of a configuration of the TrasncodeDirective.

As depicted in FIG. 34, in the case of disposing the TranscodeDirective in a Video AdaptationSet, only Video elements are present under a Parameters element. In addition, in the case of disposing the TranscodeDirective in an Audio AdaptationSet, only Audio elements are present under a Parameters element.

<Types of Upscaling>

Types of upscaling including partial image correction processing will be described with reference to FIGS. 35 to 38.

Figure 35:
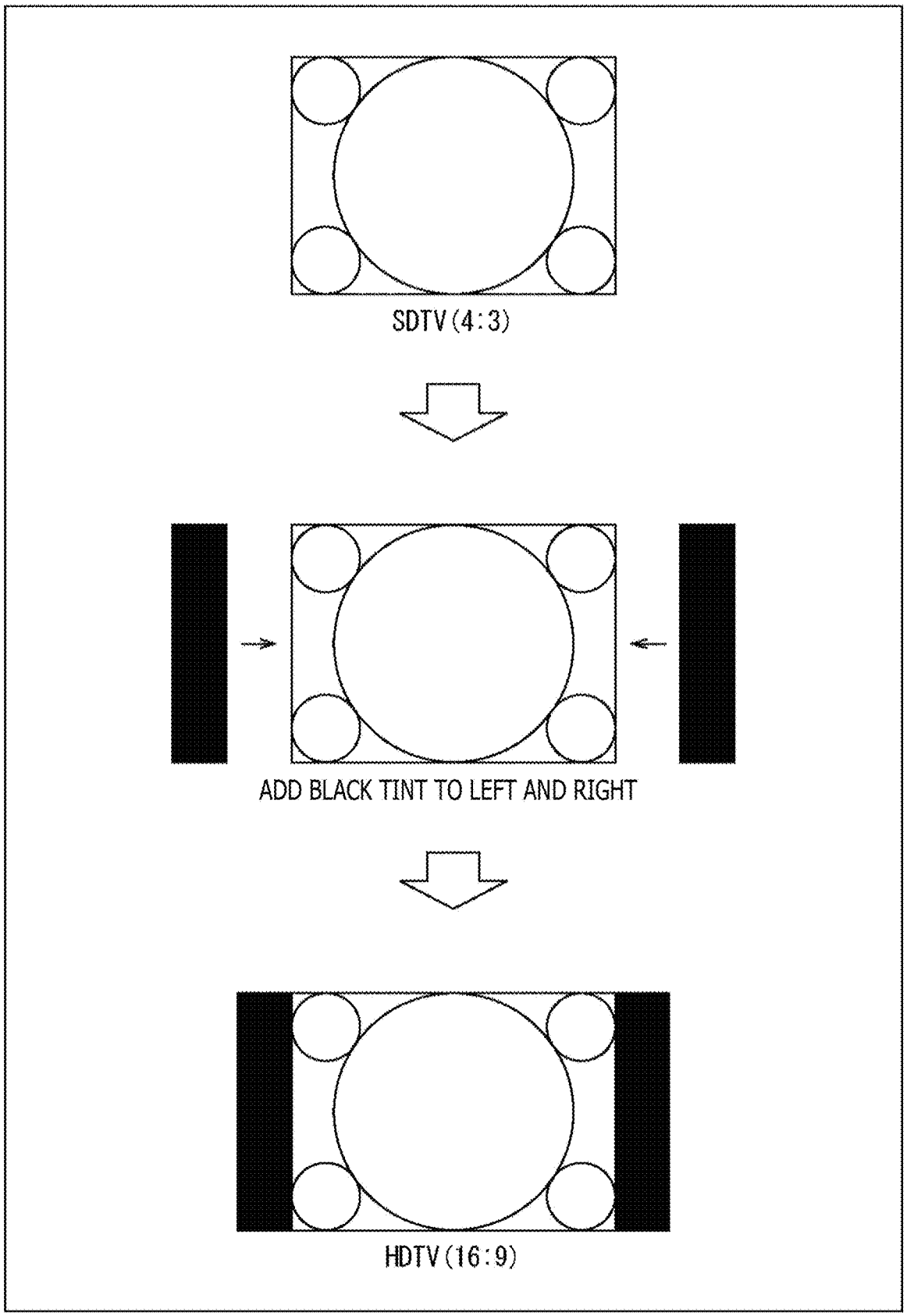
FIG. 35 is a diagram depicting an example of upscaling (FullHeight).

FIG. 35 depicts an example of upscaling (FullHeight) for transforming an SDTV (4:3) into an HDTV (16:9) by adding a black tint to left and right sides of the SDTV. It is noted that upscaling (FullWidth) for transforming the SDTV into the HDTV may be performed by adding a black tint to, for example, top and bottom sides of the SDTV and an angle of view may be transformed, or that a tint other than the black tint may be added.

FIG. 36 depicts an example of upscaling (FullWidth-TopBottomCrop-BlowUp) for transforming the SDTV (4:3) into the HDTV (16:9) by adjusting a horizontal width of the SDTV to match with the HDTV (16:9) and cropping the top and bottom sides of the SDTV. It is noted that upscaling (FullHeight-SideCrop-BlowUp) for transforming the SDTV into the HDTV may be performed by adjusting a vertical width of the SDTV to match with the HDTV and cropping left and right sides of the SDTV and the angle of view may be transformed.

FIG. 37 depicts an example of upscaling (FullSize-Anamorphic) for transforming the SDTV (4:3) into the HDTV (16:9) by horizontally stretching the SDTV. It is noted that upscaling (FullSize-Anamorphic) for transforming the SDTV into the HDTV may be performed by vertically stretching the SDTV and the angle of view may be transformed.

FIG. 38 depicts an example of upscaling (Artificial-FullSize-Anamorphic) for transforming the SDTV (4:3) into the HDTV (16:9) by complementing the left and right sides of the SDTV. At this time, the angle of view can be transformed by, for example, generating an image by analogy using an intelligent image processing technology or the like and complementing the image with an aspect ratio of an object in the image kept unchanged. In other words, as depicted in FIG. 38, an image is added in such a manner as to artificially complement (analogize, extrapolate, or imagine) the image to the left and right sides.

<Processing Using PartialTransformability>

Figure 39:
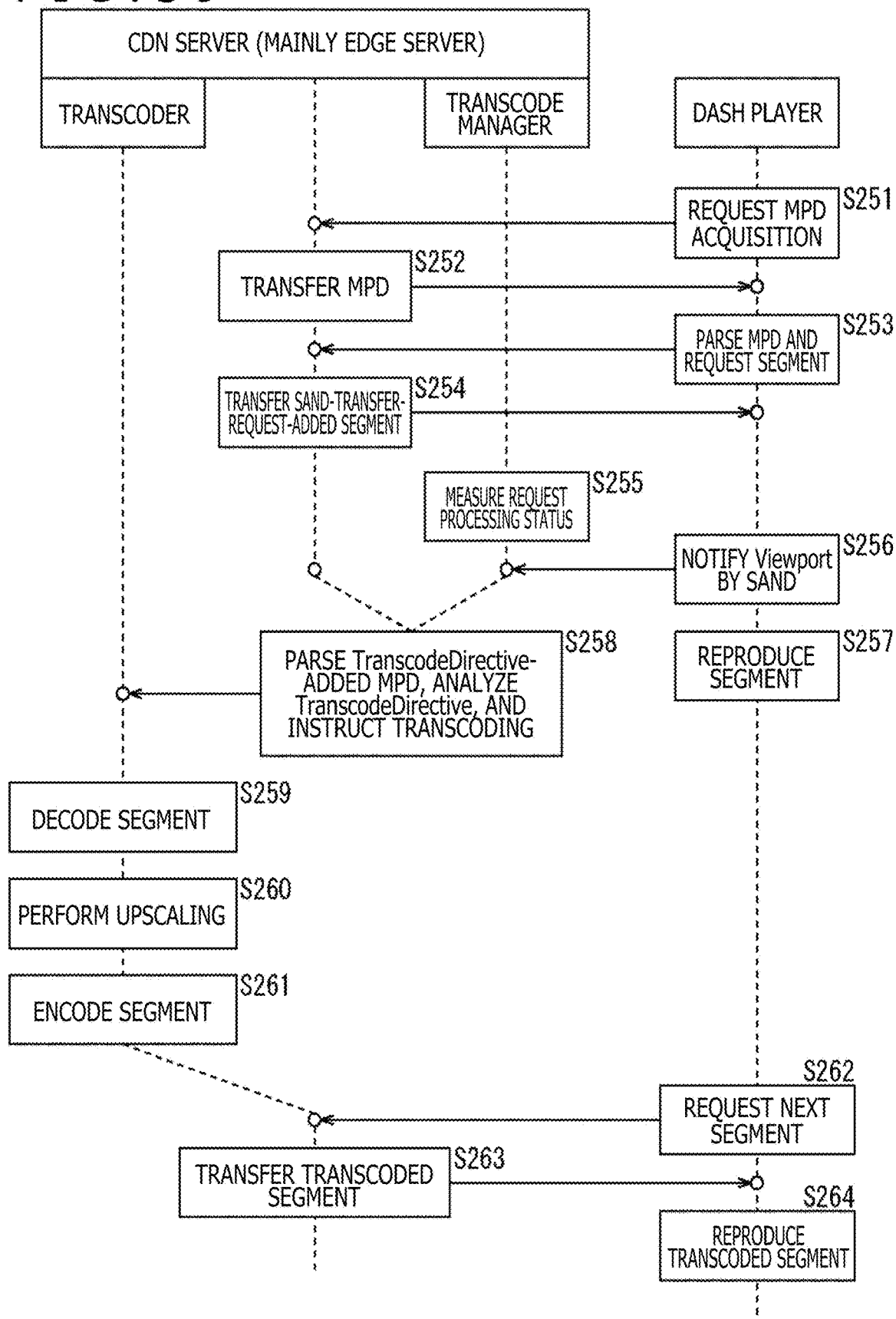
FIG. 39 is an explanatory diagram of content delivery processing for delivering a content using PartialTransformability.

Content delivery processing for delivering a content using PartialTransformability will be described with reference to FIG. 39. For example, setting the partialTransformability attribute depicted in (a) of FIG. 32 described above to true or false makes it possible to optimize transcoding including partial upscaling of an original stream based on information regarding a user's viewport on a client device. In other words, it is possible to transcode the content on the basis of client's environment information (for example, viewport).

In Step S251, the DASH player 14 requests MPD acquisition to the CDN server 41 (mainly CDN edge server 41b).

Upon receiving a request from the DASH player 14 in Step S251, the CDN server 41 transfers an MPD to the DASH player 14 in Step S252.

Upon acquiring the MPD transferred in Step S252, the DASH player 14 parses the MPD in Step S253. The DASH player 14 then requests a segment to the CDN server 41.

Upon acquiring a request from the DASH player 14 in Step S253, the CDN server 41 transfers a transfer-request-added segment using, for example, DASH metrics or the like belonging to ImmersiveMedia currently under consideration by SAND or the like in Step S254.

In Step S255, the transcode manager 43 measures a request processing status.

Upon acquiring the SAND-transfer-request-added segment transferred in Step S254, the DASH player 14 notifies viewport metadata regarding a user of the DASH player 14 by SAND in Step S256. Furthermore, the DASH player 14 reproduces the acquired segment in Step S257.

Upon acquiring the viewport notification by SAND transmitted from the DASH player 14 in Step S256, the transcode manager 43 parses a TranscodeDirective-added MPD in Step S258. The transcode manager 43 then analyzes the TranscodeDirective and instructs the transcoder 42 to perform transcoding in accordance with an analysis result.

At this time, the transcode manager 43 identifies a stream corresponding to the viewport concerned or part of the stream on the basis of contents of the MPD (for example, version extended to be compliant with OMAF planned to be extended in the future) or an MP4 file (for example, MPF file using the OMAF). The transcoder 42 can perform upscaling constrained or allowed in the TranscodeDirective on entirety of the stream or part of the stream containing the viewport concerned and then transcoding processing thereon in accordance with this identification.

In other words, the transcoder 42 performs processing in accordance with the viewport at the time of decoding the segment in Step S259 and performing upscaling in Step S260. The transcoder 42 then encodes the segment in Step S261.

In Step S262, the DASH player 14 requests a next segment.

Upon acquiring a request from the DASH player 14 in Step S262, the CDN server 41 transfers the transcoded segment requested by the DASH player 14 in Step S263.

Upon receiving the transcoded segment transferred in Step S263, the DASH player 14 reproduces the received transcoded segment in Step S264.

Subsequently, until end of content delivery, transcoded segments are continuously transferred and reproduced.

As described so far, the DASH player 14 transmits the viewport notification to the CDN server 41, so that the CDN server 41 can identify the stream corresponding to the viewport and control transcoding in such a manner as to perform upscaling appropriately.

<Viewport Notification of Client Device>

The viewport notification of the DASH player 14 that is a client device serving as a stream reproducing side will be described with reference to FIGS. 40 and 41.

Figure 40:
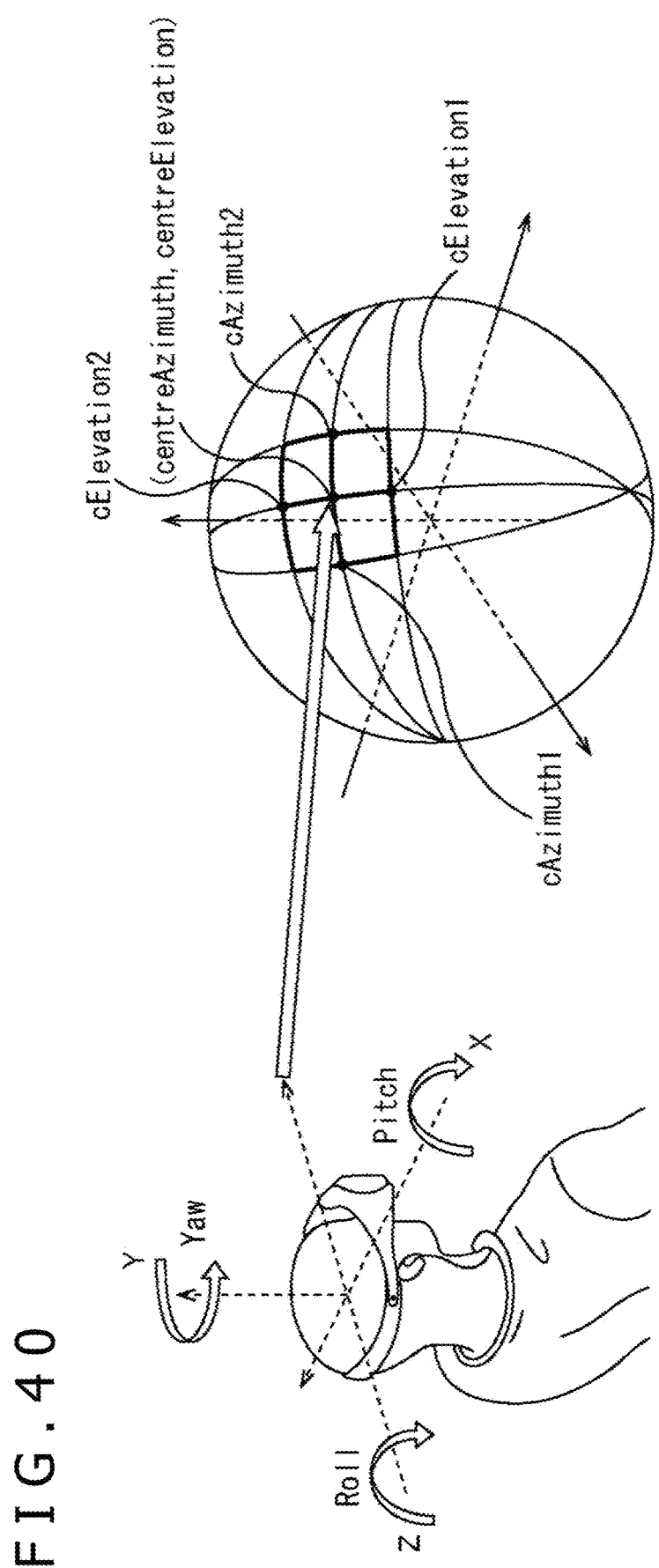
FIG. 40 is an explanatory diagram of a viewport notification.

In a case, for example, in which a viewport on a playback device is identified by an X-axis, a Y-axis, an X-axis, and angles (pitch, yaw, and roll) about these axes as depicted in FIG. 40 and a body is immovable, the angles are determined by a motion of a head. It is also set that the respective angles are increased clockwise in positive directions of the X-axis, the Y-axis, and the X-axis. It is further defined that an X-Z plane is in parallel to the ground and that all angles are zero when a person faces the positive direction of the Z-axis.

Furthermore, viewport coordinates are mapped from a coordinate system of this viewport metadata onto a coordinate system of a stream source.

Description will be given on the assumption, for example, that the coordinate system of the source uses a representation method with the use of azimuth angle/elevation angle and that the client side uses the coordinate system by representation of pitch, yaw, and roll. In this case, the viewport is mapped in such a manner that a direction in which the azimuth angle and the elevation angle (centerAzimuth/centerElevation) are both zero in the source coordinate system matches a direction in which the pitch, the yaw, and the roll of the DASH player 14 are all zero.

Moreover, viewport coordinate values on the transformed coordinate system are stored in a ViewportViews parameter of Immersive Media Metrics currently under consideration as depicted in FIG. 41 to comply with a structure SphereRegionStruct specified in the OMAF, and a SANDMessage containing this Metrics is newly defined and used.

<Device Attribute Notification from Client Device>

FIG. 42 depicts an example of device attributes notified from the DASH player 14 that is the client device serving as the stream reproducing side.

For example, capability attributes of the client device are stored in a VRDeviceInfo parameter of the Immersive Media Metrics currently under consideration as depicted in FIG. 42, and a SANDMessage containing this Metrics is newly defined and used.

<Architecture of FLUS>

An architecture of the FLU will be described with reference to FIGS. 43 and 44.

Figure 43:
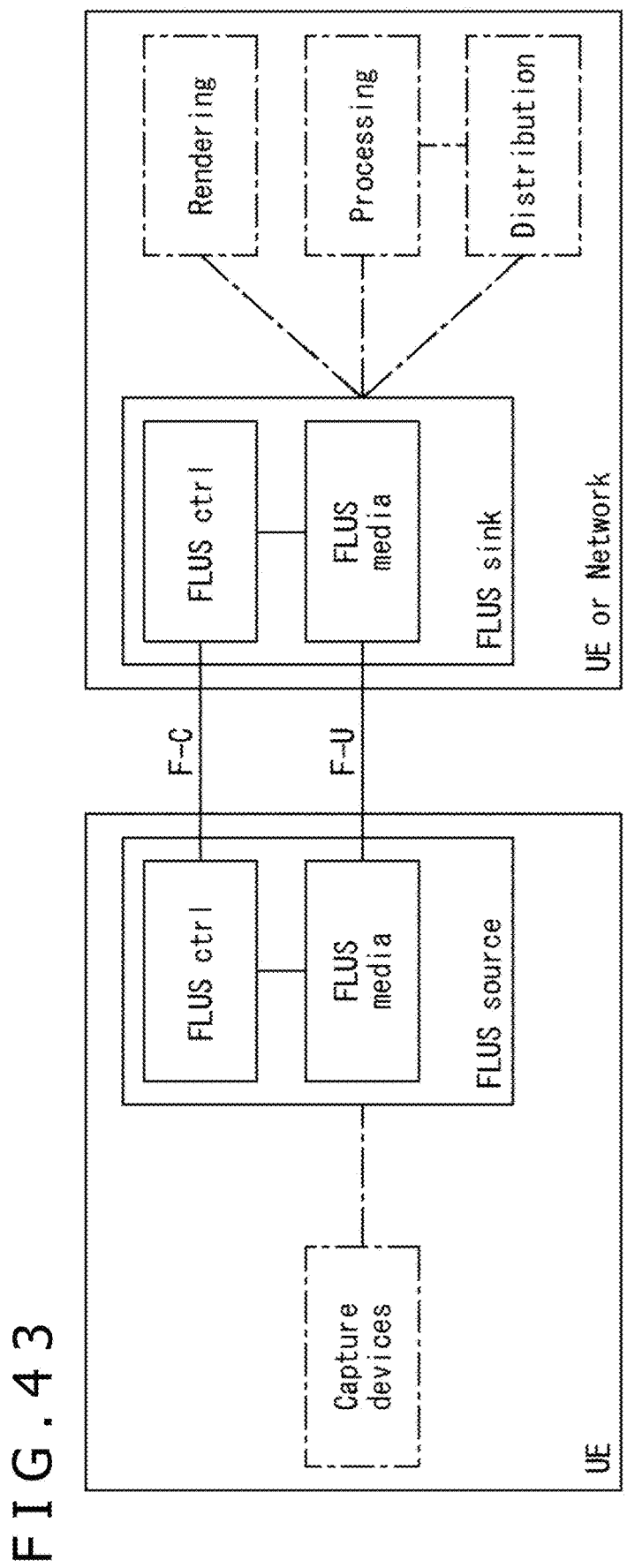
FIG. 43 is a diagram depicting functional blocks of a FLUS.

As depicted in FIG. 43, the FLUS source receives a media content from one or a plurality of capture devices. In addition, the FLUS sink decodes the media content and forwards the decoded media content to a rendering function. Alternatively, with a configuration such that the FLUS sink is implemented in a network, the media content is forwarded to a processing sub-function or a distribution sub-function.

Furthermore, the FLUS source is connected to the FLUS source by a reference point, and the FLUS source establishes and controls a single FLUS session and a plurality of media sessions.

A FLUS control plane function (F-C) controls media processing of the FLUS sink associated with uploading and subsequent downstream delivery. A FLUS user plane function (F-U) establishes a media session, performs IMS session setup in, for example, MTSI-based FLUS session establishment, and includes one or a plurality of media stream sessions.

Furthermore, the FLUS control plane function (F-C) is a function to establish and control a FLUS session. By the FLUS control plane function, the FLUS source executes opening of a media session or sessions, provisioning of static metadata regarding the media session or sessions, and selection and configuration of the processing/distribution sub-function.

Furthermore, media session opening is defined as part of the FLUS session. The FLUS user plane function (F-U) contains media session establishment procedures. It is supposed that a plurality of different media sessions is established in one FLUS session.

Moreover, the media session contains one or a plurality of media streams. The media stream contains a single media component (for example, audio only) in some cases, and contains a plurality of different media components (for example, audio and video) in other cases. The media session sometimes contains one or more identical media streams (for example, a plurality of video streams). Moreover, it is supposed that the FLUS sink opens a media session.

Figure 44:
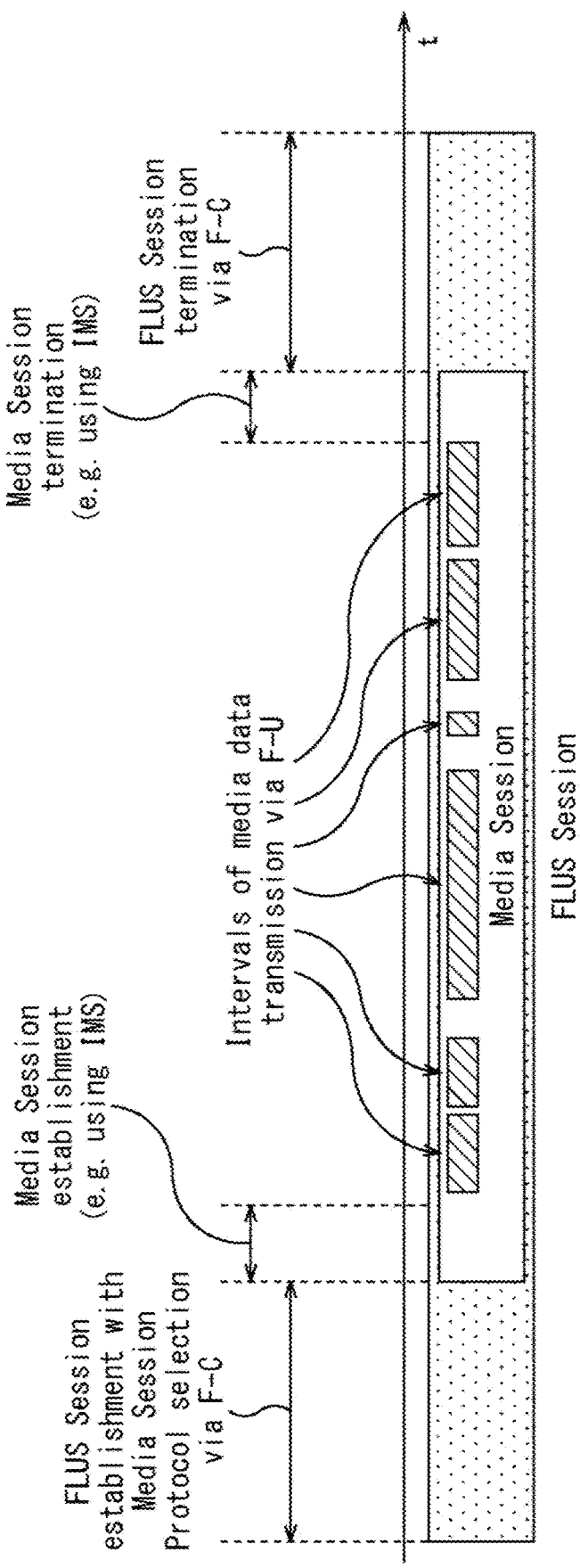
FIG. 44 is a diagram depicting an example of a FLUS Session.

FIG. 44 depicts an example of the media session and the media stream in the FLUS.

As depicted in FIG. 44, one or a plurality of media streams is transferred in the FLUS session, and the media stream is a time-dependent medium of the FLUS session. For example, when the media stream is active, the FLUS source transfers a media content to the FLUS sink.

Furthermore, the FLUS session includes zero or one or more media sessions each including one or more media streams. In the case of using HTTP in media streaming, the media session is not explicitly established.

<Additional Extension of ViewportViews Message of SAND>

Figure 45:
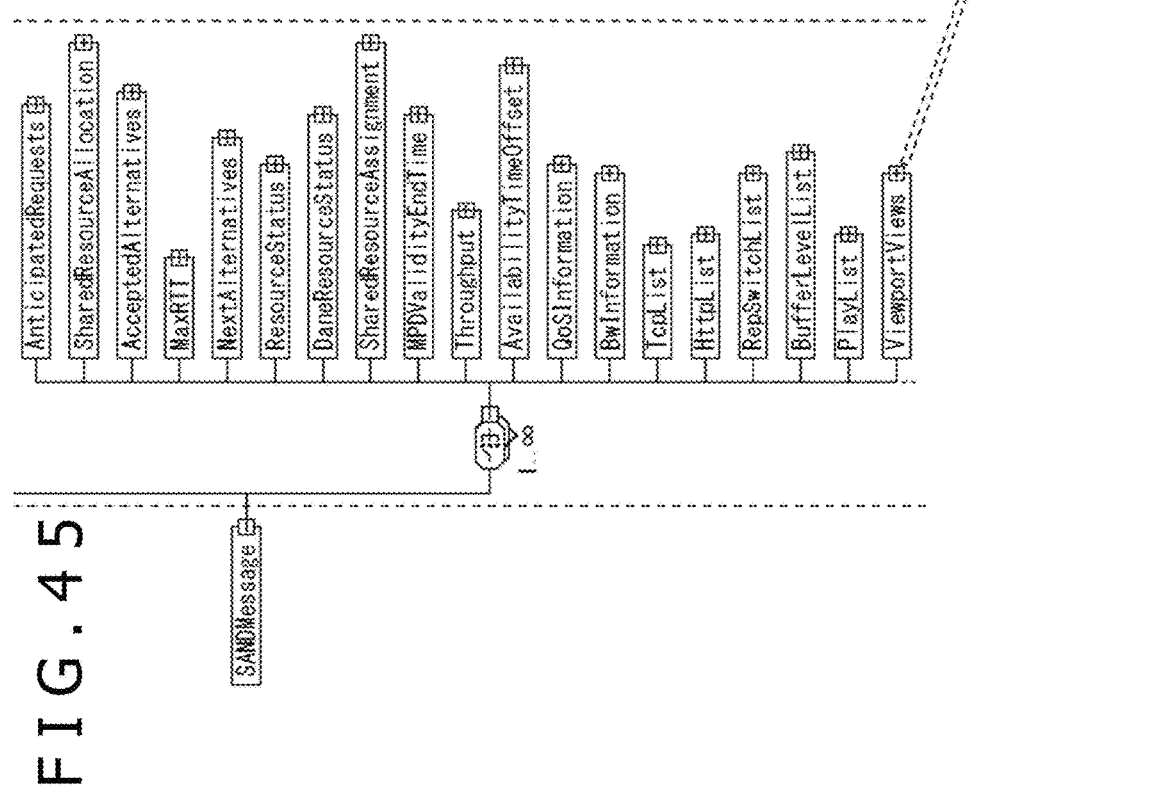
FIG. 45 is a diagram depicting an example of additional extension of a ViewportViews message of SAND.

FIG. 45 depicts an example of additional extension of a ViewportViews message of SAND.

In FIG. 45, a ViewportViewsType surrounded by a chain double-dashed line is a newly defined part.

<Example of Configuration of Computer>

The series of processing described with reference to the flowcharts described above is not necessarily performed in time series in accordance with the orders described in the flowcharts, and also include processing executed either in parallel or individually (for example, parallel processing or processing by an object). Moreover, a program may be processed by one CPU or may be processed by a plurality of CPUs in a decentralized fashion.

Furthermore, the series of processing (content delivery control method) described above can be either executed by hardware or executed by software. In the case of executing the series of processing by the software, then a program configuring the software is installed in a computer incorporated into dedicated hardware or in, for example, a general-purpose personal computer or the like capable of executing various functions by installing various programs from a program recording medium recording therein the program or programs.

FIG. 46 is a block diagram depicting an example of a configuration of the hardware of the computer executing the series of processing described above by the program.

In the computer, a CPU (Central Processing Unit) 101, a ROM (Read Only Memory) 102, and a RAM (Random Access Memory) 103 are mutually connected by a bus 104.

An input/output interface 105 is further connected to the bus 104. An input section 106 configured with a keyboard, a mouse, a microphone, and the like, an output section 107 configured with a display, a speaker, and the like, a storage section 108 configured with a hard disc, a nonvolatile memory, and the like, a communication section 109 configured with a network interface and the like, and a drive 110 that drives a removable medium 111 such as a magnetic disc, an optical disc, a magneto-optical disc, or a semiconductor memory are connected to the input/output interface 105.

In the computer configured as described above, the CPU 101 loads a program stored in, for example, the storage section 108 to the RAM 103 via the input/output interface 105 and the bus 104 and executes the program, so that the series of processing described above is performed.

The program executed by the computer (CPU 101) is recorded in, for example, the removable medium 111 that is a package medium configured with the magnetic disc (including a flexible disc), the optical disc (a CD-ROM (Compact Disc-Read Only Memory), a DVD (Digital Versatile Disc), or the like), the magneto-optical disc, or the semiconductor memory, or provided via a wired or wireless transmission medium such as a local area network, the Internet, or a digital satellite service.

Furthermore, the program can be installed in the storage section 108 via the input/output interface 105 by attaching the removable medium 111 to the drive 110. Moreover, the program can be received by the communication section 109 via the wired or wireless transmission medium and installed in the storage section 108. Additionally, the program can be installed in advance in the ROM 102 or the storage section 108.

<Example of Combination of Configurations>

It is noted that the present technology can also be configured as follows.

(1)

A content delivery control apparatus including:

a receiving section that receives a metadata file at the time of delivering a content via a predetermined upload interface from a content delivery server that has a storage section configured to store the content and definition information necessary for transcoding the content, the metadata file storing therein the definition information or first access information for accessing the definition information and second access information for accessing original data generated from the content; and a control section that exercises control associated with transcoding of the original data acquired on the basis of the second access information, in which the control section controls the transcoding of the original data on the basis of the definition information in a case in which the definition information is stored in the metadata file, and the control section requests the definition information on the basis of the first access information and controls the transcoding of the original data on the basis of the definition information received by the receiving section in response to the request in a case in which the first access information is stored in the metadata file.

(2)

The content delivery control apparatus according to (1), in which the metadata file includes an MPD (Media Presentation Description) file standardized and defined by ISO BM FF23009.

(3)

The content delivery control apparatus according to (1) or (2), in which the original data is an original segment that is compliant with MPEG-DASH (Dynamic Adaptive Streaming over HTTP).

(4)

The content delivery control apparatus according to (3), in which the access information is stored in an Adaptation Set of the MPD.

(5)

The content delivery control apparatus according to (3), in which the access information is stored in a Representation of the MPD.

(6)

The content delivery control apparatus according to (3), in which the access information is stored in a SubRepresentation of the MPD.

(7)

The content delivery control apparatus according to any one of (1) to (6), in which the original data includes an original stream delivered using an SDP (Session Description Protocol).

(8)

The content delivery control apparatus according to (7), in which the metadata file includes an SDP file standardized and defined in an IETF, and the definition information and the access information are stored in a media description portion of the SDP.

(9)

The content delivery control apparatus according to any one of (1) to (8), in which the definition information is stored as an independent file in the storage section of the content delivery server.

(10)

The content delivery control apparatus according to any one of (1) to (9), in which the definition information specifies whether or not the content is transcodable.

(11)

The content delivery control apparatus according to any one of (1) to (10), in which an upscaling scheme including partial image correction processing is defined in the definition information.

(12)

The content delivery control apparatus according to any one of (1) to (11), in which a condition description based on a condition description language used to control whether or not transcoding can be performed is defined in the definition information.

(13)

The content delivery control apparatus according to any one of (1) to (12), in which an information structure used to report contents of actually applied transcoding processing is defined in the definition information.

(14)

The content delivery control apparatus according to any one of (1) to (12), in which the content is transcoded on the basis of environment information associated with a client that acquires and reproduces the content, the environment information being acquired from the client.

(15)

The content delivery control apparatus according to (14), in which transcoding for performing upscaling to contain a viewport is controlled in response to a notification of the viewport from the client.

(16)

The content delivery control apparatus according to any one of (1) to (15), in which the content delivery server is disposed on a source side of the predetermined upload interface, and the content delivery control apparatus is disposed on a network that is a sink side of the predetermined upload interface.

(17)

The content delivery control apparatus according to (16), in which the receiving section receives the metadata file via the predetermined upload interface.

(18)

A content delivery control method including:

by a content delivery control apparatus including a receiving section that receives a metadata file at the time of delivering a content via a predetermined upload interface from a content delivery server that has a storage section configured to store the content and definition information necessary for transcoding the content, the metadata file storing therein the definition information or first access information for accessing the definition information and second access information for accessing original data generated from the content, and a control section that exercises control associated with transcoding of the original data acquired on the basis of the second access information, causing the control section to control the transcoding of the original data on the basis of the definition information in a case in which the definition information is stored in the metadata file; and causing the control section to request the definition information on the basis of the first access information and to control the transcoding of the original data on the basis of the definition information received by the receiving section in response to the request in a case in which the first access information is stored in the metadata file.

(19)

A program for causing a computer of a content delivery control apparatus, the content delivery control apparatus including a receiving section that receives a metadata file at the time of delivering a content via a predetermined upload interface from a content delivery server that has a storage section configured to store the content and definition information necessary for transcoding the content, the metadata file storing therein the definition information or first access information for accessing the definition information and second access information for accessing original data generated from the content, and a control section that exercises control associated with transcoding of the original data acquired on the basis of the second access information, to execute processing including:

causing the control section to control the transcoding of the original data on the basis of the definition information in a case in which the definition information is stored in the metadata file; and causing the control section to request the definition information on the basis of the first access information and to control the transcoding of the original data on the basis of the definition information received by the receiving section in response to the request in a case in which the first access information is stored in the metadata file.

(20)

A content delivery system including:

a first server that has a storage section configured to store a content and definition information necessary for transcoding the content;

a second server that exercises content delivery control, the second server including a receiving section that receives a metadata file at the time of delivering the content via a predetermined upload interface from the first server, the metadata file storing therein the definition information or first access information for accessing the definition information and second access information for accessing original data generated from the content, and a control section that exercises control associated with transcoding of the original data acquired on the basis of the second access information, the control section controlling the transcoding of the original data on the basis of the definition information in a case in which the definition information is stored in the metadata file, the control section requesting the definition information on the basis of the first access information and controlling the transcoding of the original data on the basis of the definition information received by the receiving section in response to the request in a case in which the first access information is stored in the metadata file; and a client that acquires and reproduces the content delivered in accordance with the content delivery control.

(21)

A content delivery control apparatus including:

a receiving section that receives a metadata file at the time of delivering a content via a predetermined upload interface from a content delivery server that has a storage section configured to store the content and definition information necessary for transcoding the content, the metadata file storing therein the definition information or first access information for accessing the definition information and second access information for accessing original data generated from the content; and a generation section that generates a new metadata file different from the metadata file received by the receiving section; and a control section that exercises control associated with transcoding of the original data acquired on the basis of the second access information, in which the control section controls the transcoding of the original data on the basis of the definition information in a case in which the definition information is stored in the metadata file, and the control section requests the definition information on the basis of the first access information and controls the transcoding of the original data on the basis of the definition information received by the receiving section in response to the request in a case in which the first access information is stored in the metadata file.

(22)

The content delivery control apparatus according to (21), in which the metadata file includes an MPD (Media Presentation Description) file standardized and defined by ISO IEC 23009.

(23)

The content delivery control apparatus according to (21) or (22), in which the original data is an original segment that is compliant with MPEG-DASH (Dynamic Adaptive Streaming over HTTP).

(24)

The content delivery control apparatus according to (23), in which the access information is stored in an Adaptation Set of the MPD.

(25)

The content delivery control apparatus according to (23), in which the access information is stored in a Representation of the MPD.

(26)

The content delivery control apparatus according to (23), in which the access information is stored in a SubRepresentation of the MPD.

(27)

The content delivery control apparatus according to any one of (21) to (26), in which the original data includes an original stream delivered using an SDP (Session Description Protocol).

(28)

The content delivery control apparatus according to (27), in which the metadata file includes an SDP file standardized and defined in an IETF, and the definition information and the access information are stored in a media description portion of the SDP.

(29)

The content delivery control apparatus according to any one of (21) to (28), in which the definition information is stored as an independent file in the storage section of the content delivery server.

(30)

The content delivery control apparatus according to any one of (21) to (29), in which the definition information specifies whether or not the content is transcodable.

(31)

The content delivery control apparatus according to any one of (21) to (30), in which an upscaling scheme including partial image correction processing is defined in the definition information.

(32)

The content delivery control apparatus according to any one of (21) to (31), in which a condition description based on a condition description language used to control whether or not transcoding can be performed is defined in the definition information.

(33)

The content delivery control apparatus according to any one of (21) to (32), in which an information structure used to report contents of actually applied transcoding processing is defined in the definition information.

(34)

The content delivery control apparatus according to any one of (21) to (32), in which the content is transcoded on the basis of environment information associated with a client that acquires and reproduces the content, the environment information being acquired from the client.

(35)

The content delivery control apparatus according to (34), in which transcoding for performing upscaling to contain a viewport is controlled in response to a notification of the viewport from the client.

(36)

The content delivery control apparatus according to any one of (21) to (35), in which the content delivery server is disposed on a source side of the predetermined upload interface, and the content delivery control apparatus is disposed on a network that is a sink side of the predetermined upload interface.

(37)

The content delivery control apparatus according to (36), in which the receiving section receives the metadata file via the predetermined upload interface.

(38)

A content delivery control method including:

by a content delivery control apparatus including a receiving section that receives a metadata file at the time of delivering a content via a predetermined upload interface from a content delivery server that has a storage section configured to store the content and definition information necessary for transcoding the content, the metadata file storing therein the definition information or first access information for accessing the definition information and second access information for accessing original data generated from the content, a generation section that generates a new metadata file different from the metadata file received by the receiving section, and a control section that exercises control associated with transcoding of the original data acquired on the basis of the second access information, causing the control section to control the transcoding of the original data on the basis of the definition information in a case in which the definition information is stored in the metadata file; and causing the control section to request the definition information on the basis of the first access information and to control the transcoding of the original data on the basis of the definition information received by the receiving section in response to the request in a case in which the first access information is stored in the metadata file.

(39)

A program for causing a computer of a content delivery control apparatus, the content delivery control apparatus including a receiving section that receives a metadata file at the time of delivering a content via a predetermined upload interface from a content delivery server that has a storage section configured to store the content and definition information necessary for transcoding the content, the metadata file storing therein the definition information or first access information for accessing the definition information and second access information for accessing original data generated from the content;

a generation section that generates a new metadata file different from the metadata file received by the receiving section; and a control section that exercises control associated with transcoding of the original data acquired on the basis of the second access information, to execute processing including:

causing the control section to control the transcoding of the original data on the basis of the definition information in a case in which the definition information is stored in the metadata file; and causing the control section to request the definition information on the basis of the first access information and to control the transcoding of the original data on the basis of the definition information received by the receiving section in response to the request in a case in which the first access information is stored in the metadata file.

(40)

A content delivery system including:

a first server that has a storage section configured to store a content and definition information necessary for transcoding the content;

a second server including a receiving section that receives a metadata file at the time of delivering the content via a predetermined upload interface from the first server, the metadata file storing therein the definition information or first access information for accessing the definition information and second access information for accessing original data generated from the content, and a generation section that generates a new metadata file different from the metadata file received by the receiving section;

a third server that has a control section configured to exercise control associated with transcoding of the original data acquired on the basis of the second access information; and a client that acquires and reproduces the content delivered in accordance with the content delivery control, in which
the content delivery control is performed such that
the control section controls the transcoding of the original data on the basis of the definition information in a case in which the definition information is stored in the metadata file, and
the control section requests the definition information on the basis of the first access information and controls the transcoding of the original data on the basis of the definition information received by the receiving section in response to the request in a case in which the first access information is stored in the metadata file.

<Example of Combination of Configurations>

It is noted that the present technology can also be configured as follows.

(1)

A content delivery control apparatus including:

a receiving section that receives a metadata file at the time of delivering a content via a predetermined upload interface from a content delivery server that has a storage section configured to store the content and definition information necessary for transcoding the content, the metadata file storing therein the definition information or first access information for accessing the definition information and second access information for accessing an original stream that is original data generated from the content and that is delivered using an SDP (Session Description Protocol); and a control section that exercises control associated with transcoding of the original stream acquired on the basis of the second access information, in which the control section controls the transcoding of the original stream on the basis of the definition information in a case in which the definition information is stored in the metadata file, and the control section requests the definition information on the basis of the first access information and controls the transcoding of the original stream on the basis of the definition information received by the receiving section in response to the request in a case in which the first access information is stored in the metadata file.

(2)

The content delivery control apparatus according to (1), in which the metadata file includes an SDP file standardized and defined in an IETF (Internet Engineering Task Force), and the definition information and the access information are stored in a media description portion of the SDP.

(3)

The content delivery control apparatus according to (1) or (2), in which the definition information is stored as an independent file in the storage section of the content delivery server.

(4)

The content delivery control apparatus according to any one of (1) to (3), in which the definition information specifies whether or not the content is transcodable.

(5)

The content delivery control apparatus according to any one of (1) to (4), in which an upscaling scheme including partial image correction processing is defined in the definition information.

(6)

The content delivery control apparatus according to any one of (1) to (5), in which a condition description based on a condition description language used to control whether or not transcoding can be performed is defined in the definition information.

(7)

The content delivery control apparatus according to any one of (1) to (6), in which an information structure used to report contents of actually applied transcoding processing is defined in the definition information.

(8)

The content delivery control apparatus according to any one of (1) to (7), in which the content is transcoded on the basis of environment information associated with a client that acquires and reproduces the content, the environment information being acquired from the client.

(9)

The content delivery control apparatus according to (8), in which transcoding for performing upscaling to contain a viewport is controlled in response to a notification of the viewport from the client.

(10)

The content delivery control apparatus according to any one of (1) to (9), in which the content delivery server is disposed on a source side of the predetermined upload interface, and the content delivery control apparatus is disposed on a network that is a sink side of the predetermined upload interface.

(11)

The content delivery control apparatus according to (10), in which the receiving section receives the metadata file via the predetermined upload interface.

(12)

A content delivery control method including:

by a content delivery control apparatus including a receiving section that receives a metadata file at the time of delivering a content via a predetermined upload interface from a content delivery server that has a storage section configured to store the content and definition information necessary for transcoding the content, the metadata file storing therein the definition information or first access information for accessing the definition information and second access information for accessing an original stream that is original data generated from the content and that is delivered using an SDP (Session Description Protocol), and a control section that exercises control associated with transcoding of the original stream acquired on the basis of the second access information, causing the control section to control the transcoding of the original stream on the basis of the definition information in a case in which the definition information is stored in the metadata file; and causing the control section to request the definition information on the basis of the first access information and to control the transcoding of the original stream on the basis of the definition information received by the receiving section in response to the request in a case in which the first access information is stored in the metadata file.

(13)

A program for causing a computer of a content delivery control apparatus, the content delivery control apparatus including a receiving section that receives a metadata file at the time of delivering a content via a predetermined upload interface from a content delivery server that has a storage section configured to store the content and definition information necessary for transcoding the content, the metadata file storing therein the definition information or first access information for accessing the definition information and second access information for accessing an original stream that is original data generated from the content and that is delivered using an SDP (Session Description Protocol), and a control section that exercises control associated with transcoding of the original stream acquired on the basis of the second access information, to execute processing including:

causing the control section to control the transcoding of the original stream on the basis of the definition information in a case in which the definition information is stored in the metadata file; and causing the control section to request the definition information on the basis of the first access information and to control the transcoding of the original stream on the basis of the definition information received by the receiving section in response to the request in a case in which the first access information is stored in the metadata file.

(14)

A content delivery system including:

a first server that has a storage section configured to store a content and definition information necessary for transcoding the content;

a second server that exercises content delivery control, the second server including a receiving section that receives a metadata file at the time of delivering the content via a predetermined upload interface from the first server, the metadata file storing therein the definition information or first access information for accessing the definition information and second access information for accessing an original stream that is original data generated from the content and that is delivered using an SDP (Session Description Protocol), and a control section that exercises control associated with transcoding of the original stream acquired on the basis of the second access information, the control section controlling the transcoding of the original stream on the basis of the definition information in a case in which the definition information is stored in the metadata file, the control section requesting the definition information on the basis of the first access information and controlling the transcoding of the original stream on the basis of the definition information received by the receiving section in response to the request in a case in which the first access information is stored in the metadata file; and a client that acquires and reproduces the content delivered in accordance with the content delivery control.

The embodiments of the present disclosure are not limited to the embodiments described above and various changes can be made without departing from the spirit of the present disclosure. Furthermore, the advantages described in the present specification are given as an example only, and the advantages are not limited to those described in the present specification and may contain other advantages.

REFERENCE SIGNS LIST

11: Content delivery system
12: Cloud
13: Content providing apparatus
14: DASH player
21: Stream source server
22: DASH delivery server
23: CDN
31: Streaming delivery manager
41: CDN server
41a: CDN origin server
41b: CDN edge server
42: Transcoder
43: Transcode manager

The invention claimed is:

1. A content delivery control apparatus comprising:
circuitry configured to
receive a metadata file at a time of delivering a content via a FLUS (Framework For Live Uplink Streaming) interface as an upload interface, as a FLUS sink, from a content delivery server that stores the content and definition information necessary for transcoding the content as a FLUS source, the metadata file storing therein the definition information or first access information for accessing the definition information and second access information for accessing an original stream that is original data generated from the content and that is delivered using an SDP (Session Description Protocol); and
manage transcoding of the original stream acquired on a basis of the second access information,
wherein, in a case in which the definition information is stored in the metadata file, the circuitry is configured to manage the transcoding of the original stream on a basis of the definition information, and
wherein, in a case in which the first access information is stored in the metadata file, the circuitry is configured to request the definition information on a basis of the first access information, and manage the transcoding of the original stream on a basis of the received definition information in response to the request.

2. The content delivery control apparatus according to claim 1, wherein
the metadata file includes an SDP file standardized and defined in an IETF (Internet Engineering Task Force), and
the definition information and the access information are stored in a media description portion of the SDP.

3. The content delivery control apparatus according to claim 1, wherein
the definition information is stored as an independent file in the content delivery server.

4. The content delivery control apparatus according to claim 1, wherein
the definition information specifies whether or not the content is transcodable.

5. The content delivery control apparatus according to claim 1, wherein
an upscaling scheme including partial image correction processing is defined in the definition information.

6. The content delivery control apparatus according to claim 1, wherein a condition description based on a condition description language used to control whether or not transcoding can be performed is defined in the definition information.

7. The content delivery control apparatus according to claim 1, wherein
an information structure used to report contents of actually applied transcoding processing is defined in the definition information.

8. The content delivery control apparatus according to claim 1, wherein
the content is transcoded on a basis of environment information associated with a client that acquires and reproduces the content, the environment information being acquired from the client.

9. The content delivery control apparatus according to claim 8, wherein
transcoding for performing upscaling to contain a viewport is controlled in response to a notification of the viewport from the client.

10. The content delivery control apparatus according to claim 1, wherein
the circuitry is configured to receive the metadata file via the predetermined upload interface.

11. A content delivery control method comprising:
receiving a metadata file at a time of delivering a content via a FLUS (Framework For Live Uplink Streaming) interface as an upload interface, as a FLUS sink, from a content delivery server that stores the content and definition information necessary for transcoding the content as a FLUS source, the metadata file storing therein the definition information or first access information for accessing the definition information and second access information for accessing an original stream that is original data generated from the content and that is delivered using an SDP (Session Description Protocol);
managing transcoding of the original stream acquired on a basis of the second access information;
managing transcoding of the original stream on a basis of the definition information, in a case in which the definition information is stored in the metadata file; and
requesting the definition information on a basis of the first access information, and managing the transcoding of the original stream on a basis of the received definition information in response to the request, in a case in which the first access information is stored in the metadata file.

12. A non-transitory computer readable medium storing instructions which, when executed, cause a content delivery control apparatus to perform operations comprising:
receiving a metadata file at a time of delivering a content via a FLUS (Framework For Live Uplink Streaming) interface as an upload interface, as a FLUS sink, from a content delivery server that stores the content and definition information necessary for transcoding the content as a FLUS source, the metadata file storing therein the definition information or first access information for accessing the definition information and second access information for accessing an original stream that is original data generated from the content and that is delivered using an SDP (Session Description Protocol);
managing transcoding of the original stream acquired on a basis of the second access information;
managing transcoding of the original stream on a basis of the definition information, in a case in which the definition information is stored in the metadata file; and
requesting the definition information on a basis of the first access information, and managing the transcoding of the original stream on a basis of the received definition information in response to the request, in a case in which the first access information is stored in the metadata file.

13. A content delivery system comprising:
a first server configured to store a content and definition information necessary for transcoding the content;
a second server configured to perform content delivery control; and a client device configured to acquire and reproduce the content delivered in accordance with the content delivery control,
wherein the second server is configured to
receive a metadata file at a time of delivering the content via a FLUS (Framework For Live Uplink Streaming) interface as an upload interface, as a FLUS sink, from the first server as a FLUS source, the metadata file storing therein the definition information or first access information for accessing the definition information and second access information for accessing an original stream that is original data generated from the content and that is delivered using an SDP (Session Description Protocol), and
manage transcoding of the original stream acquired on a basis of the second access information,
wherein, in a case in which the definition information is stored in the metadata file, the second server is configured to manage the transcoding of the original stream on a basis of the definition information,
wherein, in a case in which the first access information is stored in the metadata file, the second server is configured to request the definition information on a basis of the first access information and manage the transcoding of the original stream on a basis of the received definition information in response to the request.

14. The content delivery system according to claim 13, wherein the FLUS source is configured to receive the content from one or a plurality of capture devices, and the FLUS sink is configured to decode the content and forward the decoded content to a rendering function.

15. The content delivery system according to claim 14, wherein the FLUS sink is implemented in the network, the content is forwarded to a processing sub-function or a distribution sub-function.

16. The content delivery system according to claim 14, wherein the FLUS source is connected to the FLUS source by a reference point, and the FLUS source is configured to establish and control a single FLUS session and a plurality of media sessions.

17. The content delivery system according to claim 15, wherein the FLUS source is configured to perform opening of at least one of the plurality of media sessions, provisioning of static metadata regarding the at least one of the plurality of media sessions, selection and configuration of the processing sub-function and the distribution sub-function.

* * * * *